(12) United States Patent
Suzuki et al.

(10) Patent No.: US 10,349,356 B2
(45) Date of Patent: Jul. 9, 2019

(54) TERMINAL DEVICE, BASE STATION APPARATUS, INTEGRATED CIRCUIT, AND COMMUNICATION METHOD

(71) Applicant: Sharp Kabushiki Kaisha, Osaka (JP)

(72) Inventors: Shoichi Suzuki, Osaka (JP); Tatsushi Aiba, Osaka (JP); Kazunari Yokomakura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 215 days.

(21) Appl. No.: 15/303,675

(22) PCT Filed: Apr. 14, 2015

(86) PCT No.: PCT/JP2015/061446
§ 371 (c)(1),
(2) Date: Oct. 12, 2016

(87) PCT Pub. No.: WO2015/159877
PCT Pub. Date: Oct. 22, 2015

(65) Prior Publication Data
US 2017/0034785 A1 Feb. 2, 2017

(30) Foreign Application Priority Data
Apr. 14, 2014 (JP) ................................ 2014-082834

(51) Int. Cl.
*H04L 5/00* (2006.01)
*H04W 52/08* (2009.01)
(Continued)

(52) U.S. Cl.
CPC ........... *H04W 52/14* (2013.01); *H04L 5/0053* (2013.01); *H04W 52/08* (2013.01); *H04W 52/146* (2013.01); *H04W 52/54* (2013.01)

(58) Field of Classification Search
CPC .......................... H04L 5/0048; H04L 5/0053; H04W 52/146; H04W 52/54; H04W 52/14; H04W 52/08
See application file for complete search history.

(56) References Cited

U.S. PATENT DOCUMENTS 9,924,553 B2* 3/2018 Lim .................... H04W 76/14
2004/0128533 A1* 7/2004 Choi .................... H04B 1/707
726/28

(Continued)

OTHER PUBLICATIONS

"On standardization impact of TDD UL-DL adaptation", R1-122016, Ericsson, ST-Ericsson, 3GPP TSG-RAN WG1 #69, Prague, Czech Republic, May 21-25, 2012.

(Continued)

*Primary Examiner* — Omer S Mian
(74) *Attorney, Agent, or Firm* — ScienBiziP, P.C.

(57) ABSTRACT

A value of a first parameter in a subframe n is determined based on a TPC command for a PUCCH received in a subframe (n-$K_{PUCCH}$). A value of a second parameter in the subframe n is determined based on a TPC command for a PUSCH received in a subframe (n-$K_{PUSCH}$). A value of $K_{PUCCH}$ is specified based on a first UL-DL configuration. A value of $K_{PUSCH}$ is specified based on a second UL-DL configuration. The value of the first parameter for a subframe i of which an instruction as an uplink subframe is not performed by the first UL-DL configuration is set to the value of the first parameter for a subframe (i−1). The value of the second parameter for a subframe k of which an instruction as an uplink subframe is not performed by the second UL-DL configuration is set to the value of the second parameter for a subframe (k−1).

4 Claims, 18 Drawing Sheets

(51) Int. Cl.
*H04W 52/14* (2009.01)
*H04W 52/54* (2009.01)

(56) References Cited

U.S. PATENT DOCUMENTS

2014/0321313 A1* 10/2014 Seo .................. H04J 11/00
  370/252
2014/0370904 A1* 12/2014 Smith ................ H04W 8/005
  455/450
2015/0319738 A1* 11/2015 Fodor ................ H04W 24/10
  370/330
2017/0048856 A1*  2/2017 Sorrentino ........... H04B 1/713
2017/0105209 A1*  4/2017 Sorrentino ........ H04W 72/1289

OTHER PUBLICATIONS

"Signalling support for dynamic TDD", R1-130558, Ericsson, ST-Ericsson, 3GPP TSG-RAN WG1 #72, St Julian's, Malta, Jan. 28-Feb. 1, 2013.

* cited by examiner

FIG. 7

| UL-DL CONFIGURATION | DOWNLINK-TO-UPLINK SWITCH-POINT PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 10

| SET# | (PRIMARY CELL UL-DL CONFIGURATION, SECONDARY CELL UL-DL CONFIGURATION) | SECONDARY CELL SECOND UL REFERENCE UL-DL CONFIGURATION |
|---|---|---|
| SET 1 | (1,1),(1,2),(1,4),(1,5) | 1 |
| | (2,2),(2,5) | 2 |
| | (3,3),(3,4),(3,5) | 3 |
| | (4,4),(4,5) | 4 |
| | (5,5) | 5 |
| SET 2 | (1,0),(2,0),(3,0),(4,0),(5,0),(6,0) | 0 |
| | (2,1),(4,1),(5,1) | 1 |
| | (5,2) | 2 |
| | (4,3),(5,3) | 3 |
| | (5,4) | 4 |
| | (1,6),(2,6),(3,6),(4,6),(5,6) | 6 |
| SET 3 | (3,1) | 1 |
| | (3,2),(4,2) | 2 |
| | (1,3),(2,3) | 3 |
| | (2,4) | 4 |
| SET 4 | (0,0),(6,0) | 0 |
| | (0,1),(0,2),(0,4),(0,5),(6,1),(6,2),(6,5) | 1 |
| | (0,3),(0,6) | 3 |
| | (6,4) | 4 |
| | (0,6),(6,6) | 6 |

FIG. 12

| SET# | (PRIMARY CELL UL-DL CONFIGURATION, SECONDARY CELL UL-DL CONFIGURATION) | SECONDARY CELL SECOND DOWNLINK REFERENCE UL-DL CONFIGURATION |
|---|---|---|
| SET 1 | (0,0) | 0 |
| | (1,0),(1,1),(1,6) | 1 |
| | (2,0),(2,2),(2,1),(2,6) | 2 |
| | (3,0),(3,3),(3,6) | 3 |
| | (4,0),(4,1),(4,3),(4,4),(4,6) | 4 |
| | (5,0),(5,1),(5,2),(5,3),(5,4),(5,5),(5,6) | 5 |
| | (6,0),(6,6) | 6 |
| SET 2 | (0,1),(6,1) | 1 |
| | (0,2),(1,2),(6,2) | 2 |
| | (0,3),(6,3) | 3 |
| | (0,4),(1,4),(3,4),(6,4) | 4 |
| | (0,5),(1,5),(2,5),(3,5),(4,5),(6,5) | 5 |
| | (0,6) | 6 |
| SET 3 | (3,1),(1,3) | 4 |
| | (3,2),(4,2),(2,3),(2,4) | 5 |
| SET 4 | (0,1),(02),(0,3),(0,4),(0,5),(0,6) | 0 |
| | (1,2),(1,4),(1,5) | 1 |
| | (2,5) | 2 |
| | (3,4),(3,5) | 3 |
| | (4,5) | 4 |
| | (6,1),(6,2),(6,3),(6,4),(6,5) | 6 |
| SET 5 | (1,3) | 1 |
| | (2,3),(2,4) | 2 |
| | (3,1),(3,2) | 3 |
| | (4,2) | 4 |

FIG. 13

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 14

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 15

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 7, 6 | 4 | | | | 7, 6 | 4 | |
| 2 | | | 8, 7, 4, 6 | | | | | 8, 7, 4, 6 | | |
| 3 | | | 7, 6, 11 | 6, 5 | 5, 4 | | | | | |
| 4 | | | 12, 8, 7, 11 | 6, 5, 4, 7 | | | | | | |
| 5 | | | 13, 12, 9, 8, 7, 5, 4, 11, 6 | | | | | | | |
| 6 | | | 7 | 7 | 5 | | | 7 | 7 | |

FIG. 16

| UL-DL CONFIGURATION | SUBFRAME NUMBER | | | | | | | | | |
|---|---|---|---|---|---|---|---|---|---|---|
| | 0 | 1 | 2 | 3 | 4 | 5 | 6 | 7 | 8 | 9 |
| 0 | | | 6 | 7 | 4 | | | 6 | 7 | 4 |
| 1 | | | 6 | 4 | | | | 6 | 4 | |
| 2 | | | 4 | | | | | 4 | | |
| 3 | | | 4 | 4 | 4 | | | | | |
| 4 | | | 4 | 4 | | | | | | |
| 5 | | | 4 | | | | | | | |
| 6 | | | 7 | 7 | 5 | | | 7 | 7 | |

TERMINAL DEVICE, BASE STATION APPARATUS, INTEGRATED CIRCUIT, AND COMMUNICATION METHOD

TECHNICAL FIELD

The present invention relates to a terminal device, a base station apparatus an integrated circuit, and a communication method.

This application is based upon and claims the benefit of priority of the prior Japanese Patent Application No. 2014-082834, filed on Apr. 14, 2014, the entire contents of which are incorporated herein by reference.

BACKGROUND ART

A radio access scheme and a radio network (below referred to as "long term evolution (LTE)" or "evolved universal terrestrial radio access (EUTRAY") of the cellular mobile communication is examined in the 3rd Generation Partnership Project (3GPP). In LTE, a base station apparatus is also referred to as an evolved NodeB (eNodeB), and a terminal device is also referred to as a user equipment (UE). The LTE is a cellular communication system in which a base station apparatus covers an area, and a plurality of such areas is disposed so as to have a cell shape. A single base station apparatus may manage a plurality of cells.

The LTE corresponds to time division duplex (TDD). LTE employing a TDD scheme is also referred to as TD-LTE or LTE TDD. In TDD, an uplink signal and a downlink signal are subjected to time division duplex.

The 3GPP has examined that DL-UL Interference Management and Traffic Adaptation is applied to the TD-LTE. The traffic adaptation technique is a technique in which a ratio between uplink resources and downlink resources is changed depending on traffic of an uplink and traffic of a downlink. The traffic adaptation technique is also referred to as dynamic TDD.

In NPL 1, a method using a flexible subframe is proposed as a method for realizing traffic adaptation. A base station apparatus can receive an uplink signal or transmit a downlink signal in a flexible subframe. In NPL 1, a terminal device considers a flexible subframe as a downlink subframe as long as the base station apparatus does not perform an instruction of transmission of an uplink signal in the flexible subframe.

NPL 1 discloses that a Hybrid Automatic Repeat request (HARQ) timing for a physical downlink shared channel (PDSCH) is determined based on a UL-DL configuration (uplink-downlink configuration) which is newly applied, and a HARQ timing for a physical uplink shared channel (PUSCH) is determined based on the first UL-DL configuration.

NPL 2 discloses (a) that a UL/DL reference configuration is applied, and (b) that a certain subframe may be scheduled for any of an uplink and a downlink by dynamic grant/assignment from a scheduler.

CITATION LIST

Non Patent Literature

NPL 1: "On standardization impact of TDD UL-DL adaptation", R1-122016, Ericsson, ST-Ericsson, 3GPP TSG-RAN WG1 Meeting 469, Prague, Czech Republic, 21-25 May 2012.

NPL 2: "Signalling support for dynamic TDD", R1-130558, Ericsson, ST-Ericsson, 3GPP TSG-RAN WG1 Meeting 472, St Julian's, Malta, 28 Jan.-1 Feb. 2013.

DISCLOSURE OF THE INVENTION

Problems to be Solved by the Invention

However, specific procedures when the terminal device performs processing relating to transmission power are not disclosed in the above-described wireless communication system. For example, specific procedures when the terminal device performs transmission power control are not disclosed.

Considering the above problems, an object of the present invention is to provide a terminal device which can efficiently perform processing relating to transmission power, a base station apparatus, an integrated circuit, and a communication method.

Means for Solving the Problems (1) To solve the above object, the present invention includes units as follows. That is, a terminal device according to the present invention communicates with a base station apparatus. The terminal device includes a transmission power control unit that determines a value of a first parameter used for adjusting transmission power for transmitting a PUCCH in a subframe n, based on a TPC command for the PUCCH, which is included in a first DCI format received in a subframe (n-$K_{PUCCH}$), determines a value of a second parameter used for adjusting transmission power for transmitting a PUSCH in a subframe m, based on a TPC command for the PUSCH, which is included in a second DCI format received in a subframe (m-$K_{PUSCH}$), specifies a value of $K_{PUCCH}$ based on a first UL-DL configuration, specifies a value of $K_{PUSCH}$ based on a second UL-DL configuration, sets the value of the first parameter for a subframe i of which an instruction as an uplink subframe is not performed by the first UL-DL configuration, to the value of the first parameter for a subframe (i−1), and sets the value of the second parameter for a subframe k of which an instruction as an uplink subframe is not performed by the second UL-DL configuration, to the value of the second parameter for a subframe (k−1).

(2) A terminal device according to the present invention communicates with a base station apparatus. The terminal device includes a setting unit that sets a first UL-DL configuration and a second UL-DL configuration, a reception unit that receives DCI format 3 or DCI format 3A, and a transmission power control unit that determines a value of a first parameter used for adjusting transmission power for transmitting a PUCCH in a subframe n, based on a TPC command which is included in the DCI format 3 or the DCI format 3A received in a subframe (n-$K_{PUCCH}$), in a case where a CRC parity bit added to the DCI format 3 or the DCI format 3A is scrambled by a TPC-PUCCH-RNTI, determines a value of a second parameter used for adjusting transmission power for transmitting a PUSCH in a subframe m, based on a TPC command which is included in the DCI format 3 or the DCI format 3A received in a subframe (m-$K_{PUSCH}$), in a case where a CRC parity bit added to the DCI format 3 or the DCI format 3A is scrambled by a TPC-PUSCH-RNTI, specifies a value of $K_{PUCCH}$ based on a first UL-DL configuration, specifies a value of $K_{PUSCH}$ based on a second UL-DL configuration, sets the value of the first parameter for a subframe i of which an instruction as an uplink subframe is not performed by the first UL-DL configuration, to the value of the first parameter for a subframe (i−1), and sets the value of the second parameter for a subframe k of which an instruction as an uplink subframe is not performed by the second UL-DL configuration, to the value of the second parameter for a subframe (k−1).

(3) In the terminal device according to the present invention, the transmission power control unit specifies the value of $K_{PUCCH}$ based on the second UL-DL configuration in a case where the first UL-DL configuration is not set, and sets the value of the first parameter for the subframe i of which an instruction as an uplink subframe is not performed by the second UL-DL configuration, to the value of the first parameter for the subframe (i−1).

(4) A base station apparatus according to the present invention communicates with a terminal device. The base station apparatus includes a transmission power control unit that adjusts a first parameter used for controlling transmission power for the terminal device transmitting a PUCCH in a subframe n, in accordance with a TPC command for the PUCCH, which is transmitted in a subframe (n-$K_{PUCCH}$), and is included in a first DCI format, and adjusts a second parameter used for controlling transmission power for the terminal device transmitting a PUSCH in a subframe in, in accordance with a TPC command for the PUSCH, which is transmitted in a subframe (m-$K_{PUSCH}$), and is included in a second DCI format. The value of $K_{PUCCH}$ is specified based on a first UL-DL configuration. The value of $K_{PUSCH}$ is specified based on a second UL-DL configuration. The value of the first parameter for a subframe i of which an instruction as an uplink subframe is not performed by the first UL-DL configuration is set to the value of the first parameter for a subframe (i−1). The value of the second parameter for a subframe k of which an instruction as an uplink subframe is not performed by the second UL-DL configuration is set to the value of the second parameter for a subframe (k−1).

(5) A base station apparatus according to the present invention communicates with a terminal device. The base station apparatus includes a setting unit that sets a first UL-DL configuration and a second UL-DL configuration through a signal of a higher layer, a transmission unit that transmits DCI format 3 or DCI format 3A, and a transmission power control unit that adjusts a first parameter used for controlling transmission power for the terminal device transmitting a PUCCH in a subframe n, in accordance with a TPC command included in the DCI format 3 or the DCI format 3A which is transmitted in a subframe (n-$K_{PUCCH}$) and to which a CRC parity bit scrambled by a TPC-PUCCH-RNTI is added, and adjusts a second parameter used for controlling transmission power for the terminal device transmitting a PUSCH in a subframe m, in accordance with a TPC command included in the DCI format 3 or the DCI format 3A which is transmitted in a subframe (m-$K_{PUSCH}$) and to which a CRC parity bit scrambled by a TPC-PUSCH-RNTI is added. The value of $K_{PUCCH}$ is specified based on the first UL-DL configuration. The value of $K_{PUSCH}$ is specified based on the second UL-DL configuration. The value of the first parameter for a subframe i of which an instruction as an uplink subframe is not performed by the first UL-DL configuration is set to the value of the first parameter for a subframe (i−1). The value of the second parameter for a subframe k of which an instruction as an uplink subframe is not performed by the second UL-DL configuration is set to the value of the second parameter for a subframe (k−1).

(6) In the base station apparatus according to the present invention, in a case where the first UL-DL configuration is not set, the value of $K_{PUCCH}$ is specified based on the second UL-DL configuration, and the value of the first parameter for the subframe i of which an instruction as an uplink subframe is not performed by the second UL-DL configuration is set to the value of the first parameter for the subframe (i−1).

(7) A wireless communication method according to the present invention is used in a terminal device which communicates with a base station apparatus. The wireless communication method includes determining a value of a first parameter used for adjusting transmission power for transmitting a PUCCH in a subframe n, based on a TPC command for the PUCCH which is included in a first DCI format received in a subframe (n-$K_{PUCCH}$), determining a value of a second parameter used for adjusting transmission power for transmitting a PUSCH in a subframe m, based on a TPC command for the PUSCH which is included in a second DCI format received in a subframe (m-$K_{PUSCH}$), specifying the value of $K_{PUCCH}$ based on the first UL-DL configuration, specifying the value of $K_{PUSCH}$ based on the second UL-DL configuration, setting the value of the first parameter for a subframe i of which an instruction as an uplink subframe is not performed by the first UL-DL configuration, to the value of the first parameter for a subframe (i−1), and setting the value of the second parameter for a subframe k of which an instruction as an uplink subframe is not performed by the second UL-DL configuration, to the value of the second parameter for a subframe (k−1).

(8) A wireless communication method according to the present invention is used in a base station apparatus which communicates with a terminal device. The wireless communication method includes adjusting a first parameter used for controlling transmission power for the terminal device transmitting a PUCCH in a subframe n, in accordance with a TPC command for the PUCCH, which is transmitted in a subframe (n-$K_{PUCCH}$), and is included in a first DCI format; adjusting a second parameter used for controlling transmission power for the terminal device transmitting a PUSCH in a subframe m, in accordance with a TPC command for the PUSCH, which is transmitted in a subframe (m-$K_{PUSCH}$), and is included in a second DCI format, specifying the value of $K_{PUCCH}$ based on a first UL-DL configuration, specifying the value of $K_{PUSCH}$ based on a second UL-DL configuration, setting the value of the first parameter for a subframe i of which an instruction as an uplink subframe is not performed by the first UL-DL configuration, to the value of the first parameter for a subframe (i−1), and setting the value of the second parameter for a subframe k of which an instruction as an uplink subframe is not performed by the second UL-DL configuration, to the value of the second parameter for a subframe (k−1).

(9) An integrated circuit according to the present invention is mounted in a terminal device communicating with a base station apparatus, and causes the terminal device to perform a series of functions. The functions include a function of determining a value of a first parameter used for adjusting transmission power for transmitting a PUCCH in a subframe n, based on a TPC command for the PUCCH, which is included in a first DCI format received in a subframe (n-$K_{PUCCH}$), a function of determining a value of a second parameter used for adjusting transmission power for transmitting a PUSCH in a subframe m, based on a TPC command for the PUSCH, which is included in a second DCI format received in a subframe (m-$K_{PUSCH}$), a function of specifying the value of $K_{PUCCH}$ based on a first UL-DL configuration, a function of specifying the value of $K_{PUSCH}$ based on a second UL-DL configuration, a function of setting the value of the first parameter for a subframe i of which an instruction as an uplink subframe is not performed by the first UL-DL configuration, to the value of the first parameter for a subframe (i−1), and a function of setting the value of the second parameter for a subframe k of which an instruction as an uplink subframe is not performed by the second UL-DL configuration, to the value of the second parameter for a subframe (k−1).

(10) An integrated circuit according to the present invention is mounted in a base station apparatus communicating with a terminal device, and causes the base station apparatus to perform a series of functions. The functions include a function of adjusting a first parameter used for controlling transmission power for the terminal device transmitting a PUCCH in a subframe n, in accordance with a TPC command for the PUCCH, which is transmitted in a subframe (n-$K_{PUCCH}$) and is included in a first DCI format, and a function of adjusting a second parameter used for controlling transmission power for the terminal device transmitting a PUSCH in a subframe in, in accordance with a TPC command for the PUSCH, which is transmitted in a subframe (m-$K_{PUSCH}$) and is included in a second DCI format. The value of $K_{PUCCH}$ is specified based on a first UL-DL configuration. The value of $K_{PUSCH}$ is specified based on a second UL-DL configuration. The value of the first parameter for a subframe i of which an instruction as an uplink subframe is not performed by the first UL-DL configuration is set to the value of the first parameter for a subframe (i−1). The value of the second parameter for a subframe k of which an instruction as an uplink subframe is not performed by the second UL-DL configuration is set to the value of the second parameter for a subframe (k−1).

Effects of the Invention

According to the present invention, it is possible to cause a terminal device to efficiently perform processing relating to transmission power.

BRIEF DESCRIPTION OF THE DRAWINGS

FIG. 7 is a table illustrating an example of an UL-DL configuration in the embodiment.

FIG. 10 is a diagram illustrating a correspondence between a pair formed by the first UL reference UL-DL configuration for another serving cell (primary cell) and the first UL reference UL-DL configuration for a serving cell (secondary cell), and the second UL reference UL-DL configuration for the secondary cell in the embodiment.

FIG. 12 is a diagram illustrating a correspondence between a pair formed by the first DL reference UL-DL configuration for the primary cell and the first DL reference UL-DL configuration for the secondary cell, and the second DL reference UL-DL configuration for the secondary cell in the embodiment.

FIG. 13 is a diagram illustrating a correspondence between a subframe n to which a PDCCH/EPDCCH/PHICH is allocated, and a subframe (n+k) to which a PUSCH corresponding to the PDCCH/EPDCCH/PHICH is allocated, in the embodiment.

FIG. 14 is a diagram illustrating a correspondence between a subframe n to which a PUSCH is allocated, and a subframe (n+k) to which a PHICH corresponding to the PUSCH is allocated, in the embodiment.

FIG. 15 is a diagram illustrating a correspondence between a subframe (n−k) to which a PDSCH is allocated, and a subframe n in which HARQ-ACK corresponding to the PDSCH is transmitted, in the embodiment.

FIG. 16 is a diagram illustrating a value of $K_{PUSCH}$ in the embodiment.

MODE FOR CARRYING OUT THE INVENTION

Hereinafter, an embodiment of the present invention will be described.

In the embodiment, a plurality of cells is configured in a terminal device. A technique in which the terminal device performs communication through a plurality of cells is referred to as cell aggregation or carrier aggregation. The present invention may be applied in each of a plurality of cells configured for the terminal device. The invention may be applied in some of the plurality of configured cells. The cells configured for the terminal device are also referred to as serving cells.

A plurality of serving cells to be configured includes one primary cell, and one or a plurality of secondary cells. The primary cell is a serving cell in which an initial connection establishment procedure is performed, a serving cell in which a connection re-establishment procedure starts, or a cell of which an instruction as a primary cell is performed in a handover procedure. When or after an RRC connection is established, the secondary cell may be configured.

In a wireless communication system according to the embodiment, a time division duplex (TDD) scheme is applied. In case of cell aggregation, the TDD scheme may be applied to all of a plurality of cells. In case of the cell aggregation, a cell to which the TDD scheme is applied and a cell to which a frequency division duplex (FDD) scheme is applied may be aggregated. In a case of the cell aggregation, the present invention may be applied to some cells.

Figure 1:
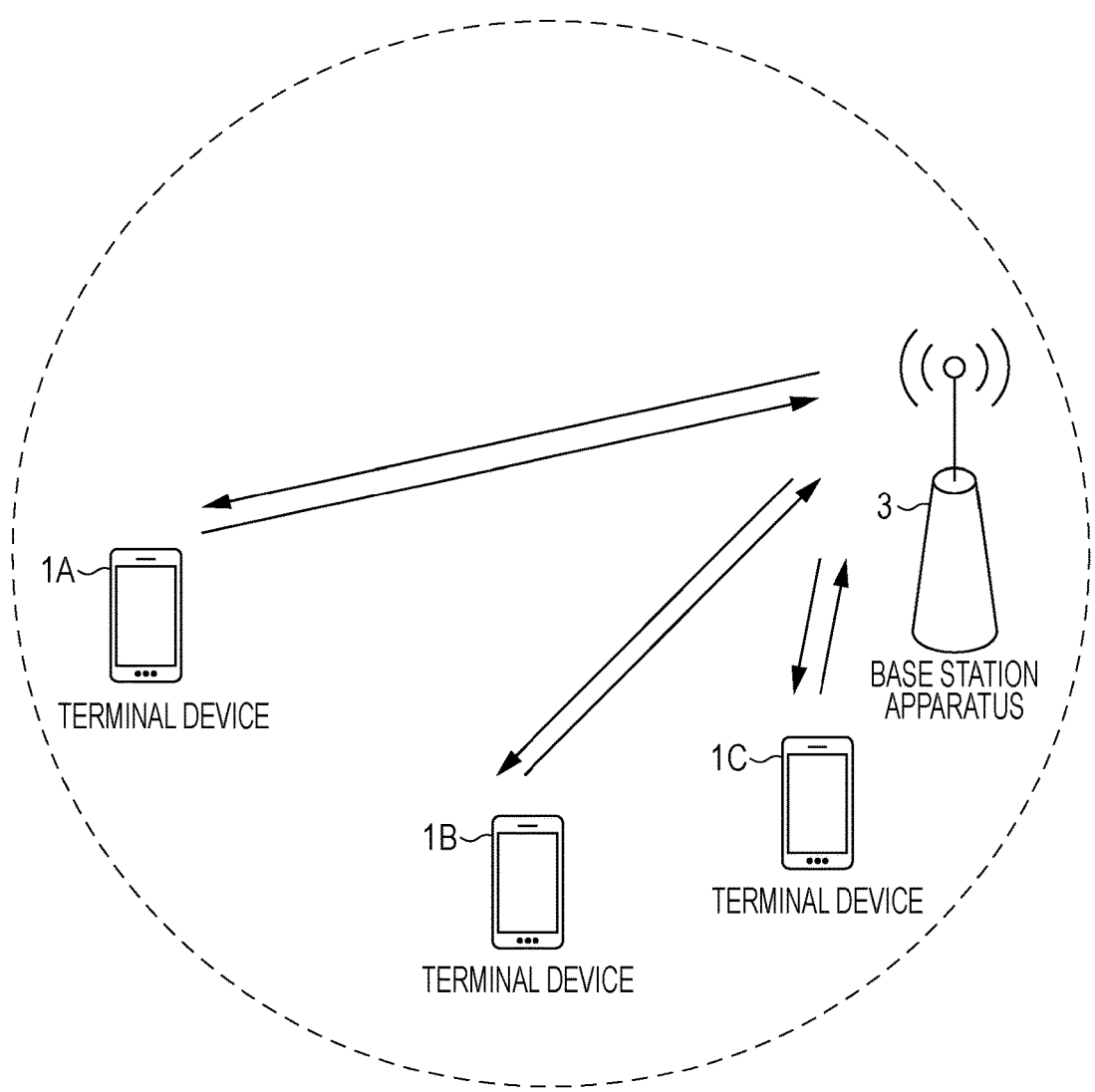
FIG. 1 is a schematic diagram illustrating a wireless communication system according to an embodiment.

FIG. 1 is a schematic diagram illustrating a wireless communication system according to the embodiment. In FIG. 1, the wireless communication system includes terminal devices 1A to 1C and a base station apparatus 3. The terminal devices 1A to 1C are also described below as terminal devices 1.

A physical channel and a physical signal in the embodiment will be described.

In FIG. 1, the following uplink physical channels are used in a radio communication of an uplink from the terminal device 1 to the base station apparatus 3. Each of the uplink physical channels is used for transmitting information which has been output from a higher layer.

Physical uplink control channel (PUCCH)
Physical uplink shared channel (PUSCH)
Physical random access channel (PRACH)

The PUCCH is a physical channel used for transmitting uplink control information (UCI). The uplink control information includes channel state information (CSI) of a downlink, a scheduling request (SR) indicating a request of a PUSCH resource, and acknowledgement (ACK)/negative-acknowledgement (NACK) in response to downlink data (Transport block, Downlink-Shared Channel: DL-SCH). ACK/NACK is also referred to as HARQ-ACK, HARQ feedback, or response information.

The PUSCH is a physical channel used for transmitting uplink data (Uplink-Shared Channel: UL-SCH). The PUSCH is used for transmitting HARQ-ACK and/or channel state information along with the uplink data. The PUSCH may be used for transmitting only channel state information or for transmitting only HARQ-ACK and channel state information.

The PRACH is a physical channel used for transmitting a random access preamble. The PRACH is used for indicating an initial connection establishment procedure, a handover procedure, a connection re-establishment procedure, synchronization (timing adjustment) with uplink transmission, and a request of PUSCH resources.

In FIG. 1, the following uplink physical signal is used in a radio communication of an uplink. The uplink physical signal is not used for transmitting information which has been output from the higher layer, but is used by a physical layer.

Uplink reference signal (UL RS)

In the embodiment, the following two types of uplink reference signals are used.

Demodulation reference signal (DMRS)
Sounding reference signal (SRS)

The DMRS is associated with transmission of a PUSCH or a PUCCH. The DMRS is subjected to time multiplexing along with the PUSCH or the PUCCH. The base station apparatus 3 uses a DMRS for performing channel correction of the PUSCH or the PUCCH. Transmitting the PUSCH and the DMRS together is simply referred to transmission of the PUSCH, below. Transmitting the PUCCH and the DMRS together is simply referred to transmission of the PUCCH, below.

The SRS is not associated with transmission of a PUSCH or a PUCCH. The base station apparatus 3 uses the SRS for measuring a channel state of an uplink. The terminal device 1 transmits a first SRS with a first resource configured by a higher layer. In a case where the terminal device 1 receives information indicating that transmission of the SRS is required on a PDCCH, the terminal device 1 transmission a second SRS with a second resource configured by the higher layer, only once. The first SRS is also referred to as a periodic SRS or a type-0-triggered SRS. The second SRS is also referred to as an aperiodic SRS or a type-1-triggered SRS. Transmission of the aperiodic SRS is scheduled by information indicating that transmission of the SRS is required.

In FIG. 1, the following downlink physical channels are used in a radio communication of a downlink from the base station apparatus 3 to the terminal device 1. Each of the downlink physical channels is used for transmitting information which has been output from a higher layer.

Physical broadcast channel (PBCH)
Physical control format indicator channel (PCFICH)
Physical hybrid automatic repeat request indicator channel (PHICH)
Physical downlink control channel (PDCCH)
Enhanced physical downlink control channel (EPDCCH)
Physical downlink shared channel (PDSCH)
Physical multicast channel (PMCH)

The PBCH is used for broadcasting master information block (MIB, Broadcast Channel: BCH) which is commonly used between the terminal devices 1.

The PCFICH is used for transmitting information which is used for performing an instruction of a region (OFDM symbol) used in transmission of a PDCCH.

The PHICH is used for transmitting a HARQ indicator (HARQ feedback, response information) which indicates acknowledgement (ACK) or negative-acknowledgement KNACK) in response to uplink data (Uplink Shared Channel: UL-SCH) received by the base station apparatus 3.

The PDCCH and the EPDCCH are used for transmitting downlink control information (DCI). The downlink control information is also referred to as a DCI format. The downlink control information includes DCI format 3, DCI format 3A, a downlink grant, and an uplink grant. The downlink grant is also referred to as downlink assignment or downlink allocation.

The DCI format 3 and/or the DCI format 3A are also referred to as DCI format 3/3A. The DCI format 3/3A is used for transmitting a plurality of transmission power control (TPC) commands for the PUSCH of a primary cell, or for transmitting a plurality of TPC commands for the PUCCH of the primary cell. One TPC command included in the DCI format 3 has two bits. One TPC command included in the DCI format 3A has one bit.

The base station apparatus 3 transmits a signal of a higher layer to the terminal device 1. The signal of a higher layer includes information indicating a value of the TPC-PUSCH-RNTI, information indicating a parameter (tpc-index) corresponding to the TPC-PUSCH-RNTI, information indicating a value of the TPC-PUCCH-RNTI, and information indicating the parameter (tpc-index) corresponding to the TPC-PUCCH-RNTI. The base station apparatus 3 transmits a signal of a higher layer, which includes information of an instruction of monitoring the DCI format 3 or the DCI format 3A, to the terminal device 1.

A cyclic redundancy check (CRC) parity bit is added to the DCI format. The CRC parity bit added to the DCI format 3/3A is scrambled by the TPC-PUSCH-RNTI or the TPC-PUSCH-RNTI.

In a case where the CRC parity bit added to the DCI format 3/3A is scrambled by the TPC-PUSCH-RNTI, the terminal device 1 determines that the DCI format 3/3A includes a TPC command for the PUSCH. In a case where the CRC parity bit added to the DCI format 3/3A is scrambled by the TPC-PUCCH-RNTI, the terminal device 1 determines that the DCI format 3/3A includes a TPC command for the PUCCH.

The DCI format 3/3A to which the CRC parity bit scrambled by the TPC-PUSCH-RNTI is added is also referred to as DCI format 3/3A for a PUSCH. The DCI format 3/3A to which the CRC parity bit scrambled by the TPC-PUCCH-RNTI is added is also referred to as DCI format 3/3A for a PUCCH.

The terminal device 1 determines an index of a TPC command for the terminal device 1, based on the parameter (tpc-index) given by a higher layer.

The base station apparatus 3 may transmit the DCI format 3/3A in a common search space (CSS) of a primary cell. The terminal device 1 may monitor the DCI format 3/3A in the CSS of the primary cell. The terminal device 1 may examine decoding of a PDCCH/EPDCCH for the DCI format 3/3A, in the CSS of the primary cell.

The downlink grant is used for scheduling of a single PDSCH in a single cell. The downlink grant is used for scheduling of a PDSCH in the same subframe as a subframe in which the downlink grant is transmitted. The downlink grant includes a TPC command for a PUCCH.

The uplink grant is used for scheduling of a single PUSCH in a single cell. The uplink grant is used for scheduling of a PUSCH in a subframe after 4 or more subframes from a subframe in which the uplink grant is transmitted. The uplink grant includes a TPC command for a PUSCH.

A CRC parity bit added to the downlink grant or the uplink grant is scrambled by a cell-radio network temporary identifier (C-RNTI) or a semi persistent scheduling cell-radio network temporary identifier (SPS C-RNTI). The C-RNTI and the SPS C-RNTI are identifiers for identifying a terminal device in a cell.

The C-RNTI is used for controlling a PDSCH or a PUSCH in a single subframe. The SPS C-RNTI is used for periodically allocating resources of the PDSCH or the PUSCH.

The PDSCH is used for transmitting downlink data (Downlink Shared Channel: DL-SCH).

The PMCH is used for transmitting multicast data (Multicast Channel: MCH).

In FIG. 1, the following downlink physical signals are used in the radio communication of a downlink. The downlink physical signals are not used for transmitting information which has been output from a higher layer, but is used by a physical layer.

Synchronization signal (SS)
Downlink reference signal (DL RS)

The synchronization signal is used when the terminal device 1 takes synchronization of a downlink between a frequency domain and a time domain. In the TDD scheme, the synchronization signal is mapped on the subframes 0, 1, 5, and 6 in a radio frame. In the FDD scheme, the synchronization signal is mapped on the subframes 0 and 5 in a radio frame.

The downlink reference signal is used when the terminal device 1 performs channel correction of a downlink physical channel. The downlink reference signal is used when the terminal device 1 calculates channel state information of a downlink.

In the embodiment, the following five types of downlink reference signals are used.

Cell-specific reference signal (CRS)
UE-specific reference signal (URS) associated with PDSCH
Demodulation reference signal (DMRS) associated with EPDCCH
Non-zero power channel state information-reference signal (NZP CSI-RS)
Zero power channel state information-reference signal (ZP CSI-RS)
Multimedia broadcast and multicast service over single frequency network reference signal (MBSFN RS)
Positioning reference signal (PRS)

The CRS is transmitted in the entire band of a subframe. The CRS is used for demodulating a PBCH/PDCCH/PHICH/PCFICH/PDSCH. The CRS may be used when the terminal device 1 calculates channel state information of a downlink. The PBCH/PDCCH/PHICH/PCFICH is transmitted on an antenna port which is used in transmission of the CRS.

The URS associated with a PDSCH is transmitted in a subframe and a band used in transmission of a PDSCH associated with the URS. The URS is used for demodulating a PDSCH associated with the URS.

The PDSCH is transmitted through an antenna port which is used in transmission of the CRS or the URS. The DCI format 1A is used for scheduling the PDSCH which is transmitted on an antenna port used in transmission of the CRS. The DCI format 2D is used for scheduling the PDSCH which is transmitted on an antenna port used in transmission of the URS.

The DMRS associated with the EPDCCH is transmitted in a subframe and a band used in transmission of the EPDCCH associated with the DMRS. The DMRS is used for demodulating the EPDCCH associated with the DMRS. The EPDCCH is transmitted on an antenna port used in transmission of the DMRS.

The NZP CSI-RS is transmitted in a configured subframe. A resource in which the NZP CSI-RS is transmitted is configured by the base station apparatus. The NZP CSI-RS is used when the terminal device 1 calculates channel state information of a downlink. The terminal device 1 performs signal measurement (channel measurement) by using the NZP CSI-RS.

Resources of the ZP CSI-RS are configured by the base station apparatus 3. The base station apparatus 3 transmits the LP CSI-RS with zero output. That is, the base station apparatus 3 does not transmit the ZP CSI-RS. The base station apparatus 3 does not transmit the PDSCH and the EPDCCH in the configured resources of the ZP CSI-RS. For example the terminal device 1 may measure interference between resources corresponding to the NZP CSI-RS corresponds, in a certain cell.

The MBSFN RS is transmitted in the entire band of a subframe which is used in transmission of the PMCH. The MBSFN RS is used for demodulating the PMCH. The PMCH is transmitted on an antenna port used in transmission of the MBSFN RS.

The PRS is used when the terminal device measures the geographical position thereof.

The downlink physical channels and the downlink physical signal are collectively referred to as downlink signals. The uplink physical channels and the uplink physical signals are collectively referred to as uplink signals. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. Channels which are used in a medium access control (MAC) layer are referred to as transport channels. A unit of a transport channel which is used in the MAC layer is also referred to as a transport block (TB) or a MAC protocol data unit (PDU). Control of a Hybrid Automatic Repeat reQuest (HARQ) is performed for each transport block in the MAC layer. The transport block is a unit of data which is delivered to a physical layer by the MAC layer. In the physical layer, the transport block is mapped to a code word, and encoding is performed for each code word.

A constitution of a radio frame in the embodiment will be described below.

Figure 2:
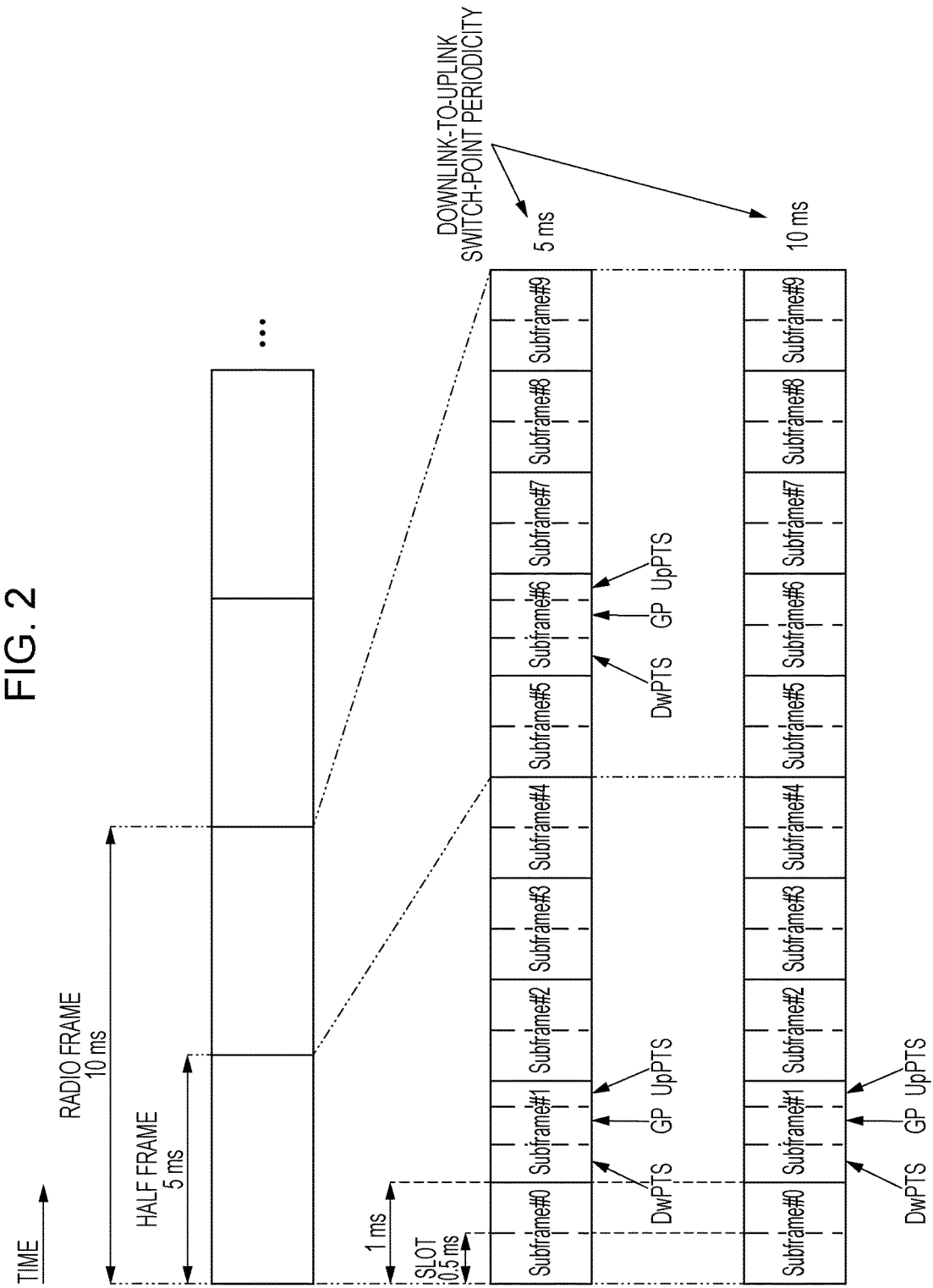
FIG. 2 is a schematic diagram illustrating a constitution of a radio frame according to the embodiment.

FIG. 2 is a schematic diagram illustrating a constitution of a radio frame in the embodiment. The length of each radio frame is 10 ms. In FIG. 2, a horizontal axis indicates a time axis. Each radio frame is constituted by two half frames. The length of each of the half frames is 5 ms. Each of the half frames is constituted by five subframes. The length of each of the subframes is 1 ms. Each of the subframes is defined by two consecutive slots. The length of each of the slots is 0.5 ms. An i-th subframe in a radio frame is constituted by a (2×i)th slot and a (2×i+1)th slot. That is, 10 subframes can be used at each internal of 10 ms.

In the embodiment, the following three types of subframes are defined.

Downlink subframe (first subframe)
Uplink subframe (second subframe)
Special subframe (third subframe)

The downlink subframe is a subframe reserved for downlink transmission. The uplink subframe is a subframe reserved for uplink transmission. The special subframe is constituted by three fields. The three fields are a downlink pilot time slot (DwPTS), a guard period (GP), and an uplink pilot time slot (UpPTS). The total length of the DwPTS, the GP, and the UpPTS is 1 ms. The DwPTS is a field reserved for downlink transmission. The UpPTS is a field reserved for uplink transmission. The GP is a field in which the downlink transmission and the uplink transmission are not performed. The special subframe may be constituted only by the DwPTS and the GP, or may be constituted only by the GP and the UpPTS.

A single radio frame is constituted by at least a downlink subframe, an uplink subframe, and a special subframe.

A constitution of a slot in the embodiment will be described below.

Figure 3:
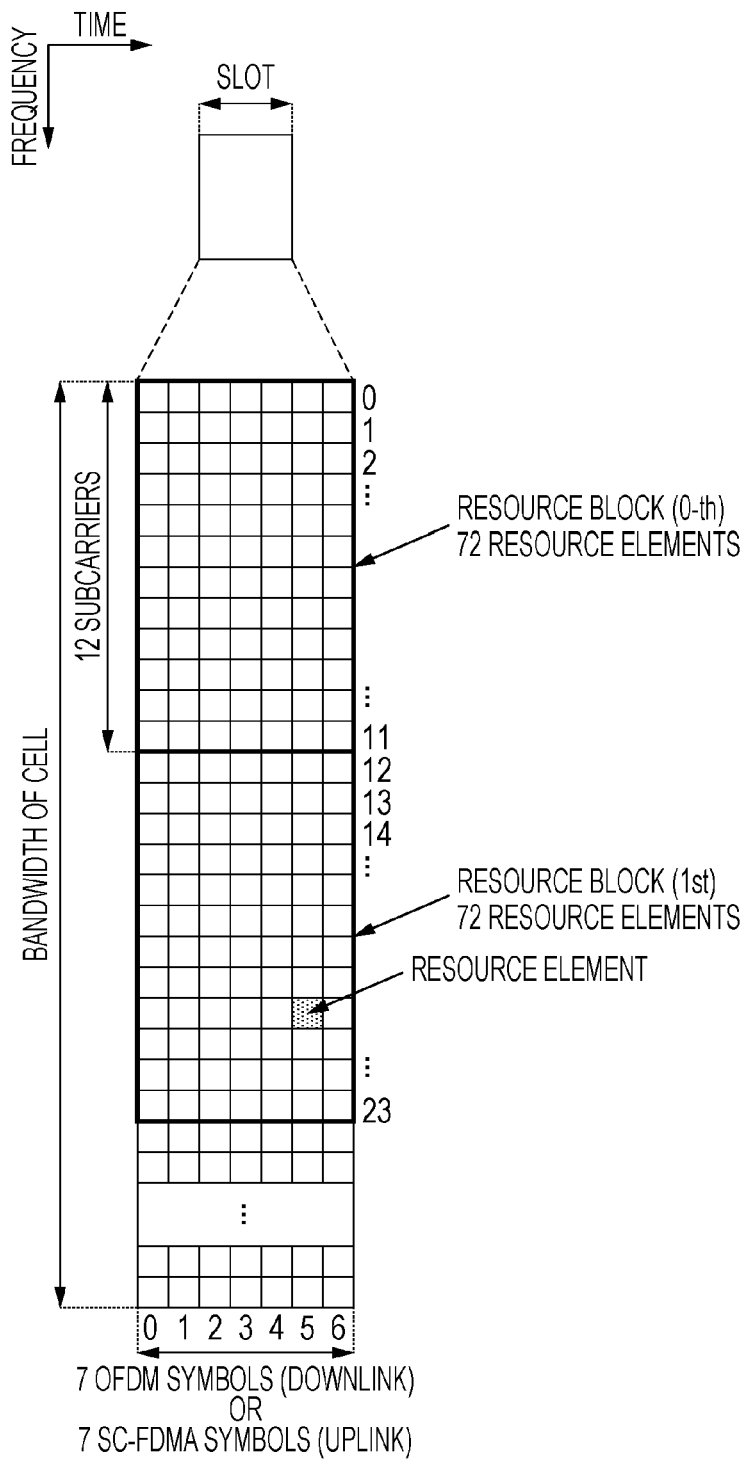
FIG. 3 is a diagram illustrating a constitution of a slot according to the embodiment.

FIG. 3 is a diagram showing the constitution of a slot in the embodiment. In the embodiment, a normal cyclic prefix (normal CP) is applied to an OFDM symbol. An extended cyclic prefix (extended CP) may be applied to an OFDM symbol. A physical signal or a physical channel transmitted in each slot is expressed by resource grid. In FIG. 3, a horizontal axis indicates a time axis, and a vertical axis indicates a frequency axis. The resource grid is defined by a plurality of subcarriers and a plurality of OFDM symbols in a downlink. The resource grid is defined by a plurality of subcarriers and a plurality of SC-FDMA symbols in an uplink. The number of subcarriers constituting one slot depends on the bandwidth of a cell. The number of OFDM symbols or SC-FDMA symbols constituting one slot is 7. Each element in the resource grid is referred to as a resource element. The resource element is identified by using a subcarrier number, and an OFDM symbol number or a SC-FDMA symbol number.

A resource block is used for expressing mapping to a resource element of a certain physical channel (PDSCH, PUSCH, or the like). In the resource block, a virtual resource block and a physical resource block are defined. A certain physical channel is firstly mapped to the virtual resource block. Then, the virtual resource block is mapped to the physical resource block. One physical resource block is defined by seven continuous OFDM symbols or SC-FDMA symbols in a time domain and twelve continuous subcarriers in a frequency domain. Thus, one physical resource block is constituted by (7×12) resource elements. In addition, one physical resource block corresponds to one slot in the time domain, and corresponds to 180 kHz in the frequency domain. The physical resource block is numbered from 0 in the frequency domain.

A physical channel and a physical signal which are transmitted in each subframe will be described below.

Figure 4:
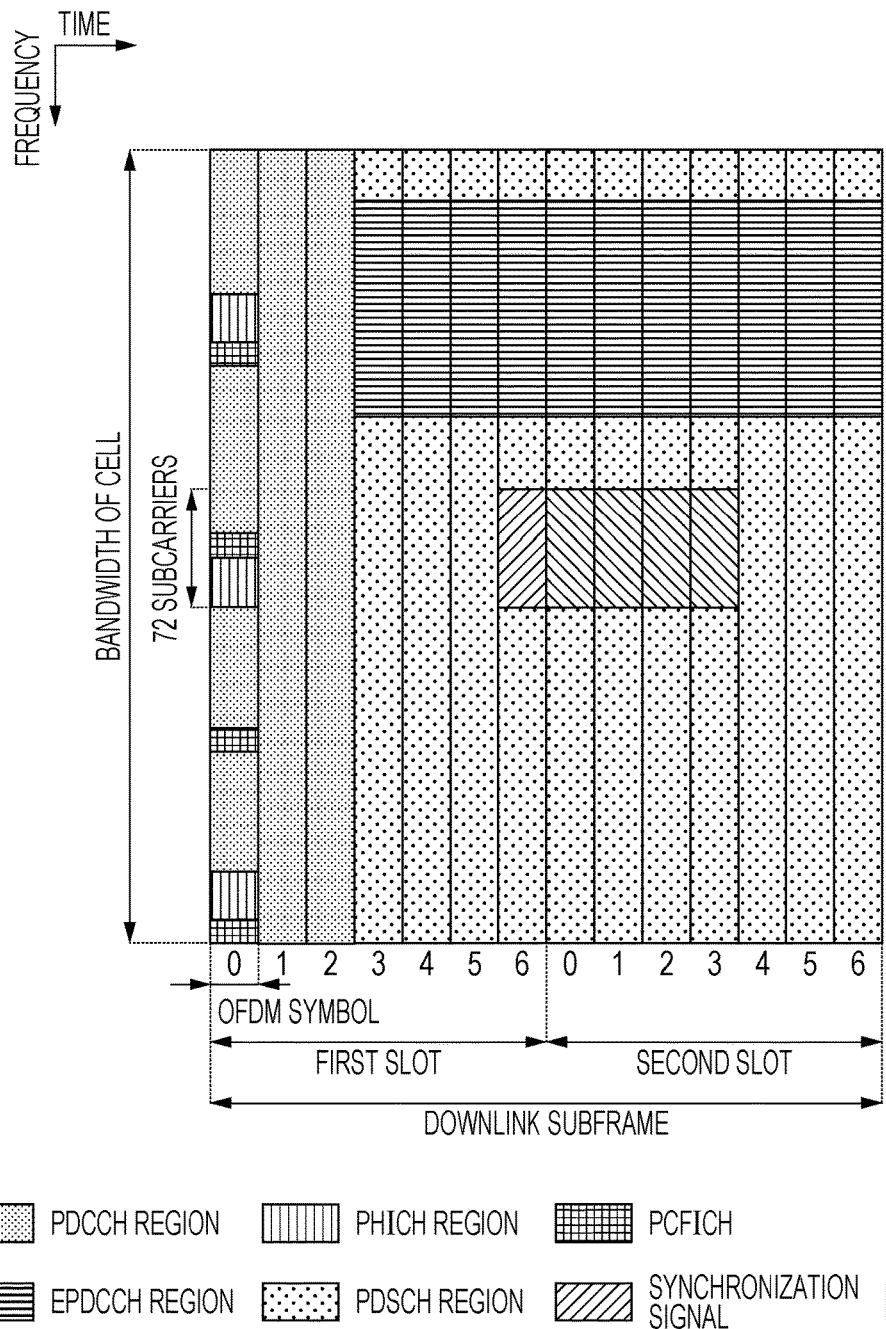
FIG. 4 is a diagram illustrating an example of mapping of a physical channel and a physical signal in a downlink subframe in the embodiment.

FIG. 4 is a diagram showing an example of the mapping of physical channels and physical signals in a downlink subframe in the embodiment. In FIG. 4, a horizontal axis indicates a time axis, and a vertical axis indicates a frequency axis. The base station apparatus 3 may transmit a downlink physical channel (PBCH, PCFICH, PHICH, PDCCH, EPDCCH, PDSCH) and a downlink physical signal (synchronization signal, downlink reference signal) in a downlink subframe. The PBCH is transmitted only in the subframe 0 in a radio frame. The downlink reference signal is mapped on resource elements which are distributed in the frequency domain and the time domain. For simplification of description, the downlink reference signal is not illustrated in FIG. 4.

In a PDCCH region, a plurality of PDCCHs may be subjected to frequency multiplexing and time multiplexing. In an EPDCCH region, a plurality of EPDCCHs may be subjected to frequency multiplexing, time multiplexing, and spatial multiplexing. In a PDSCH region, a plurality of PDSCHs may be subjected to frequency multiplexing and spatial multiplexing. The PDCCH, and the PDSCH, or the EPDCCH may be subjected to time multiplexing. The PDSCH and EPDCCH may be subjected to frequency multiplexing.

Figure 5:
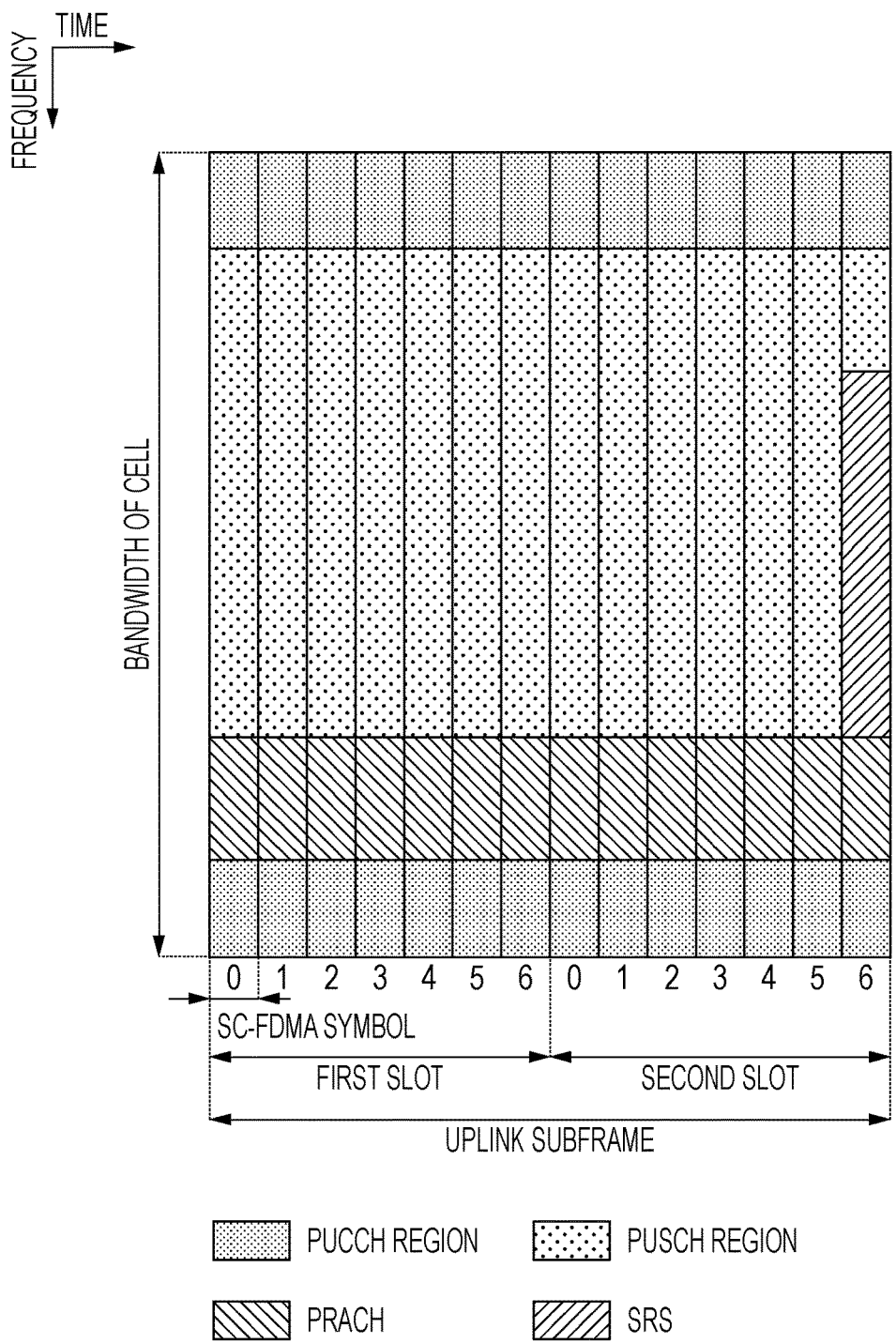
FIG. 5 is a diagram illustrating an example of mapping of a physical channel and a physical signal in an uplink subframe in the embodiment.

FIG. 5 is a diagram illustrating an example of the mapping of physical channels and physical signals in an uplink subframe in the embodiment. In FIG. 5, a horizontal axis indicates a time axis, and a vertical axis indicates a frequency axis. The terminal device 1 may transmit an uplink physical channel (PUCCH, PUSCH, PRACH) and an uplink physical signal (DMRS. SRS) in an uplink subframe. In a PUCCH region, a plurality of PUCCHs is subjected to frequency multiplexing, time multiplexing, and code multiplexing. In a PUSCH region, a plurality of PUSCHs may be subjected to frequency multiplexing, and spatial multiplexing. The PUCCH and the PUSCH may be subjected to frequency multiplexing. The PRACH may be allocated over a single subframe or two subframes. A plurality of PRACHs may be subjected to code multiplexing.

An SRS is transmitted by using the last SC-FDMA symbol in the uplink subframe. That is, the SRS is mapped on the last SC-FDMA symbol in the uplink subframe. It is impossible that the terminal device 1 simultaneously transmits the SRS and the PUCCH/PUSCH/PRACH in a single SC-FDMA symbol in a single cell. In a single uplink subframe in a single cell, the terminal device 1 may transmit a PUSCH and/or a PUCCH by using SC-FDMA symbols other than the last SC-FDMA symbol in the uplink subframe, and may transmit an SRS by using the last SC-FDMA symbol in the uplink subframe. That is, in the single uplink subframe in the single cell, the terminal device 1 can transmit both of the SRS and the PUSCH/PUCCH. The DMRS is subjected to time multiplexing along with the PUCCH or the PUSCH. For simplification of description, the DMRS is not illustrated in FIG. 5.

Figure 6:
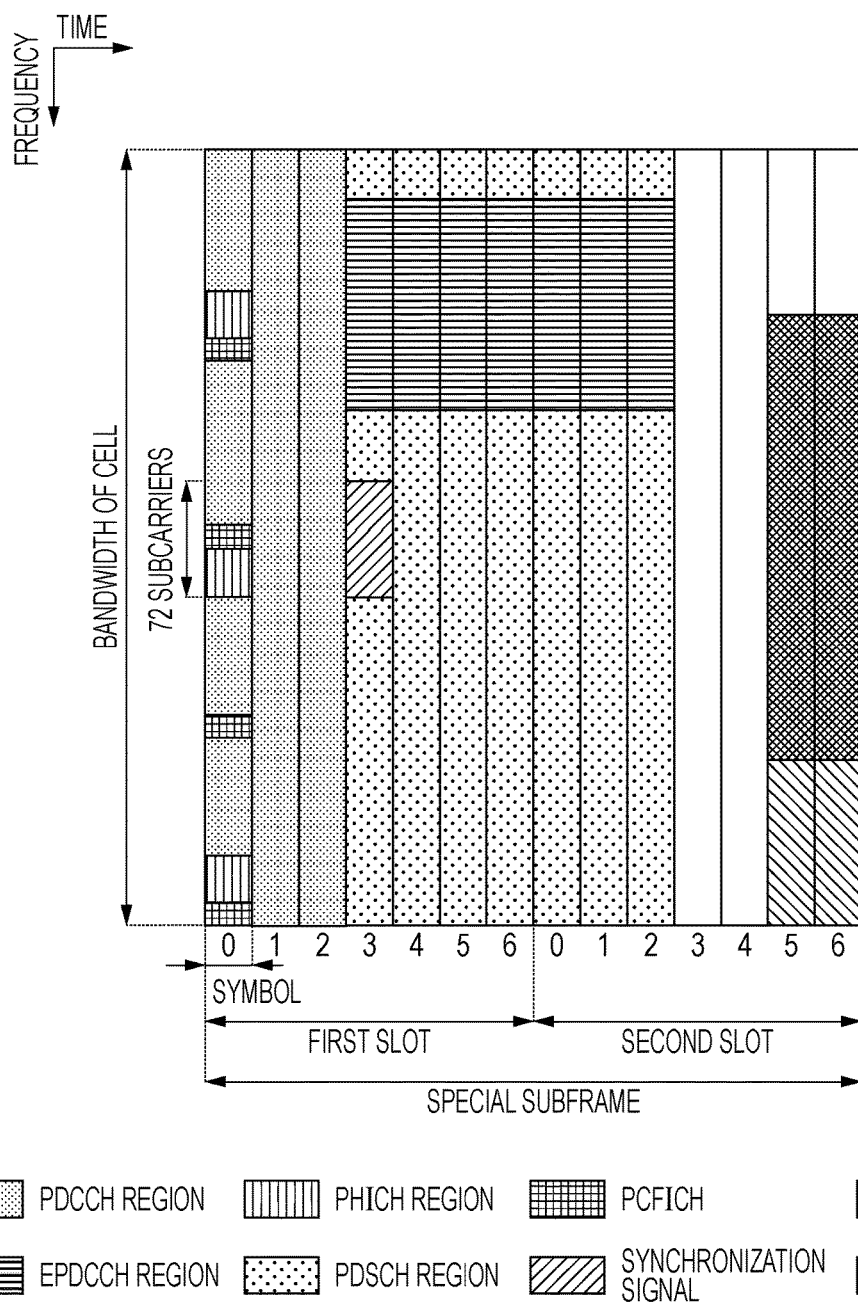
FIG. 6 is a diagram illustrating an example of mapping of a physical channel and a physical signal in a special subframe in the embodiment.

FIG. 6 is a diagram illustrating an example of the mapping of physical channels and physical signals in a special subframe in the embodiment. In FIG. 6, a horizontal axis indicates a time axis, and a vertical axis indicates a frequency axis. In FIG. 6, a DwPTS is constituted by the first to the tenth OFDMA symbols in a special subframe. A GP is constituted by the 11th SC-FDMA symbol and the 12th SC-FDMA symbol in the special subframe. An UpPTS is constituted by the 13th SC-FDMA symbol and the 14th SC-FDMA symbol in the special subframe.

The base station apparatus 3 may transmit a PCFICH, a PHICH, a PDCCH an EPDCCH, a PDSCH, a synchronization signal, and a downlink reference signal in the DwPTS of the special subframe. The base station apparatus 3 does not transmit a PBCH in the DwPTS of the special subframe. The terminal device 1 may transmit a PRACH and an SRS in the UpPTS of the special subframe. That is, the terminal device 1 does not transmit a PUCCH, a PUSCH, and a DMRS in the UpPTS of the special subframe.

A first UL reference UL-DL configuration (uplink reference uplink-downlink configuration), a first DL reference UL-DL configuration (downlink reference uplink-downlink configuration), a second UL reference UL-DL configuration, a second DL reference UL-DL configuration, and a transmission-direction UL-DL configuration (transmission direction uplink-downlink configuration) will be described below.

the first UL reference UL-DL configuration, the first DL reference UL-DL configuration, the second UL reference UL-DL configuration, the second DL reference UL-DL configuration, and the transmission-direction UL-DL configuration are defined by an UL-DL configuration (uplink-downlink configuration, UL-DL configuration).

The UL-DL configuration is a configuration relating to a pattern of subframes in a radio frame. The UL-DL configuration indicates that each subframe in a radio frame is any of a downlink subframe, an uplink subframe, and a special subframe.

That is, each of the first UL reference UL-DL configuration, the second UL reference UL-DL configuration, the first DL reference UL-DL configuration, the second DL reference UL-DL configuration, and the transmission-direction UL-DL configuration is defined by a pattern of a downlink subframe, an uplink subframe, and a special subframe in a radio frame.

The pattern of a downlink subframe, an uplink subframe, and a special subframe indicates which one of a downlink subframe, an uplink subframe, and a special subframe each of subframes #0 to #9 is. Preferably the pattern is expressed by any combination of D, U, and S (which respectively indicate a downlink subframe, an uplink subframe, and a special subframe) which has a length of 10. More preferably the leading subframe (that is, subframe #0) is D, and the second subframe (that is, subframe #1) is S.

FIG. 7 is a table illustrating an example of the UL-DL configuration in the embodiment. In FIG. 7, D indicates a downlink subframe, U indicates an uplink subframe, and S indicates a special subframe.

Setting an UL-DL configuration i as the first or second UL reference UL-DL configuration is referred to that a first or second UL reference UL-DL configuration i is set. Setting an UL-DL configuration i as the first or second DL reference UL-DL configuration is referred to that a first or second DL reference LTL-DL configuration i is set. Setting an UL-DL configuration i as the transmission-direction UL-DL configuration is referred to that a transmission-direction UL-DL configuration i is set.

Setting methods of the first UL reference UL-DL configuration, the first DL reference UL-DL configuration, and the transmission-direction UL-DL configuration will be described below The base station apparatus 3 sets a first UL reference UL-DL configuration, a first DL reference UL-DL configuration, and a transmission-direction UL-DL configuration. The base station apparatus 3 may transmit first information (TDD-Config) indicating the first UL reference UL-DL configuration, second information indicating the first DL reference UL-DL configuration, and third information indicating the transmission-direction UL-DL configuration, with including at least one of an MIB, a system information block type 1 message, a system information message, an RRC message, an MAC control element (CE), and control information (for example, DCI format) of the physical layer. The base station apparatus 3 may include the first information, the second information, and the third information in any of the MIB, the system information block type 1 message, the system information message, the RRC message, the MAC control element (CE), and the control information (for example, DCI format) of the physical layer, depending on a situation.

The first UL reference LTL-DL configuration, the second UL reference UL-DL configuration, the first DL reference UL-DL configuration, the second DL reference UL-DL configuration, and the transmission-direction UL-DL configuration may be defined for each of a plurality of serving cells.

The base station apparatus 3 transmits the first information, the second information, and the third information for each serving cell to the terminal device 1 in which a plurality of serving cells is configured. The first information, the second information, and the third information may be defined for each serving cell.

The terminal device 1 in which a plurality of serving cells is configured may set the first UL reference UL-DL configuration, the first DL reference UL-DL configuration, and the transmission direction DL-UL configuration for each serving cell, based on the first information, the second information, and the third information.

The first information for a primary cell is preferably included in the system information block type 1 message or the RRC message. The first information for a secondary cell is preferably included in the RRC message. The second information for a primary cell is preferably included in the system information block type 1 message, the system information message, or the RRC message. The second information for a secondary cell is preferably included in the RRC message. The third information is preferably included in the control information (for example, DCI format) of the physical layer.

The system information block type 1 message is initially transmitted on a PDSCH in the subframe 5 of a radio frame which satisfies the SFN mod 8=0. The system information block type 1 message is repeatedly transmitted in the subframe 5 of another radio frame which satisfies the SFN mod 2=0. The system information block type 1 message includes information indicating a constitution (lengths of a DwPTS, a GP, and an UpPTS) of a special subframe. The system information block type 1 message is cell-specific information.

The system information message is transmitted on the PDSCH. The system information message is cell-specific information. The system information message includes a system information block X other than the system information block type 1.

The RRC message is transmitted on the PDSCH. The RRC message is information/signal processed in the RRC layer. The RRC message may be common for a plurality of terminal devices 1 in a cell, or may be dedicated for a specific terminal device 1.

The MAC CE is transmitted on the PDSCH. The MAC CE is information/signal processed in the MAC layer.

Figure 8:
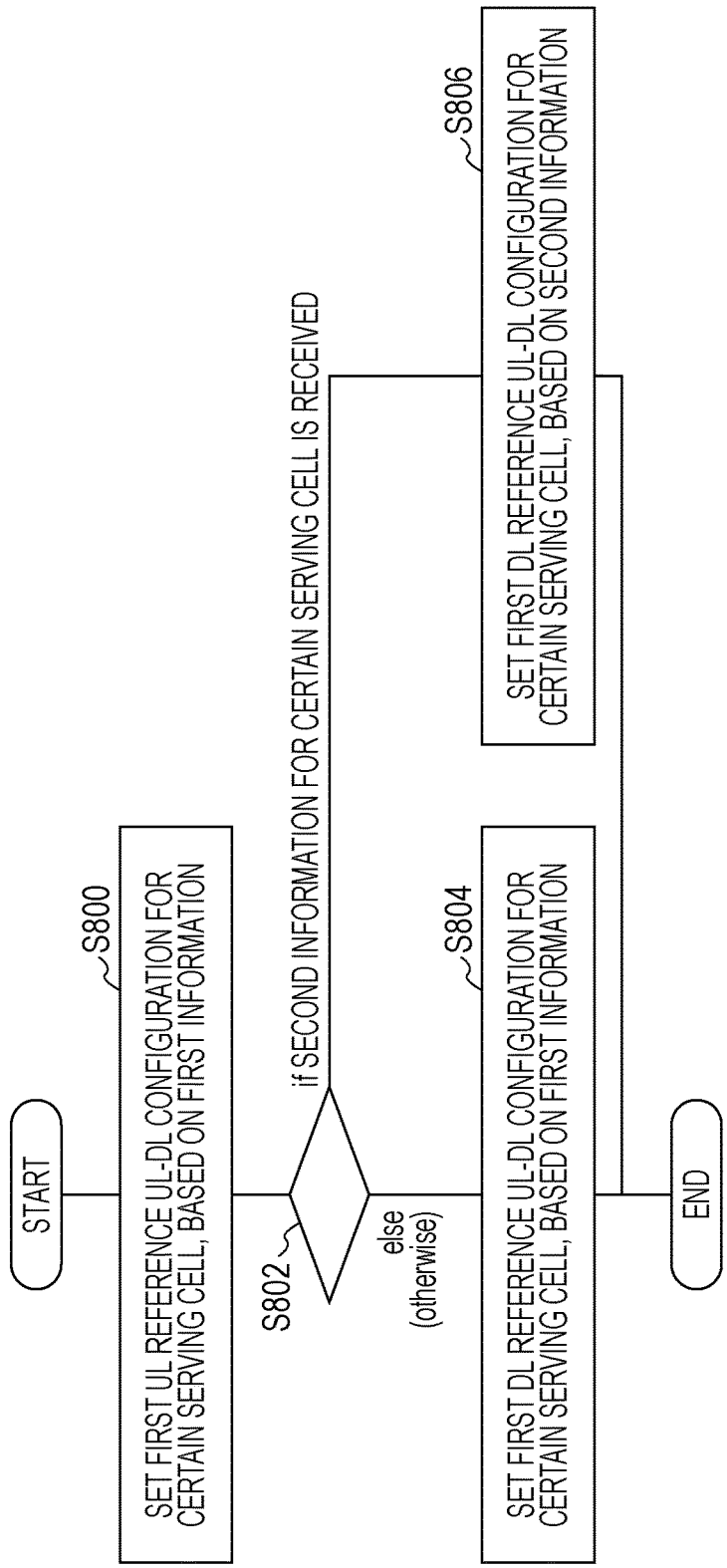
FIG. 8 is a flowchart illustrating a setting method of a first UL reference UL-DL configuration and a first DL reference UL-DL configuration in the embodiment.

FIG. 8 is a flowchart illustrating the setting method of the first UL reference UL-DL configuration and the first DL reference UL-DL configuration in the embodiment. The terminal device 1 performs the setting method in FIG. 8 for each of a plurality of serving cells.

The terminal device 1 sets a first UL reference UL-DL configuration for a certain serving cell, based on first information (S800). The terminal device 1 determines whether or not the terminal device 1 receives second information for the certain serving cell (S802). In a case where the terminal device 1 receives the second information for the certain serving cell, the terminal device 1 sets a first DL reference UL-DL configuration for the certain serving cell, based on the second information for the certain serving cell (S806). In a case (else/otherwise) where the terminal device 1 does not receive the second information for the certain serving cell, the terminal device 1 sets the first DL reference UL-DL configuration for the certain serving cell, based on the first information for the certain serving cell (S804).

A serving cell in which the first UL reference UL-DL configuration and the first DL reference UL-DL configuration are set based on the first information is also referred to as a serving cell in which dynamic TDD is not configured. A serving cell in which the first DL reference UL-DL configuration is set based on the second information is also referred to as a serving cell in which dynamic TDD is configured.

In a case where the terminal device 1 does not receive the second information for the certain serving cell, the first UL reference UL-DL configuration and the first DL reference UL-DL configuration may not be defined. In a case where the terminal device 1 does not receive the second information for the certain serving cell, the terminal device 1 may set one UL-DL configuration for the certain serving cell, based on the first information for the certain serving cell.

The terminal device 1 receives the second information and determines a subframe in which transmission of an uplink signal is allowed, based on the received second information. Then, the terminal device 1 monitors third information. In a case where the terminal device 1 receives the third information, the terminal device 1 determines a subframe in which transmission of an uplink signal is allowed, based on the received third information.

For example, the base station apparatus 3 transmits the third information to the terminal device 1 by using a PDCCH/EPDCCH. The third information is used when the base station apparatus (cell) 3 controls an operation of dynamic TDD in coverage. The third information may be transmitted and received in a common search space (CSS) and/or an UE-specific search space (USS). The CSS is a region in which a plurality of terminal devices 1 commonly monitors the PDCCH/EPDCCH. The USS is a region defined based on at least a C-RNTI.

The terminal device 1 examines decoding of a received signal, and determines whether or not a PDCCH/EPDCCH including the third information is detected. In a case where the terminal device 1 detects the PDCCH/EPDCCH including the third information, the terminal device 1 determines a subframe in which transmission of an uplink signal is allowed, based on the detected third information. In a case where the terminal device 1 does not detect the PDCCH/EPDCCH including the third information, the terminal device 1 may maintain determinations until now, which relate to the subframe in which transmission of an uplink signal is allowed.

A setting method of the second UL reference UL-DL configuration will be described below.

In a case where a plurality of serving cells is configured for the terminal device 1 and first UL reference UL-DL configurations for at least two serving cells are different from each other, the terminal device 1 and the base station apparatus 3 set a second UL reference UL-DL configuration.

The terminal device 1 and the base station apparatus 3 may not set the second UL reference UL-DL configuration in cases other than the case where a plurality of serving cells is configured for the terminal device 1 and first UL reference UL-DL configurations for at least two serving cells are different from each other.

The cases other than the case where first UL reference UL-DL configurations for at least two serving cells are different from each other correspond to a case where first UL reference UL-DL configurations for all serving cells are the same as each other. The terminal device 1 and the base station apparatus 3 may not set the second UL reference UL-DL configuration in a case where one serving cell is configured for the terminal device 1.

Figure 9:
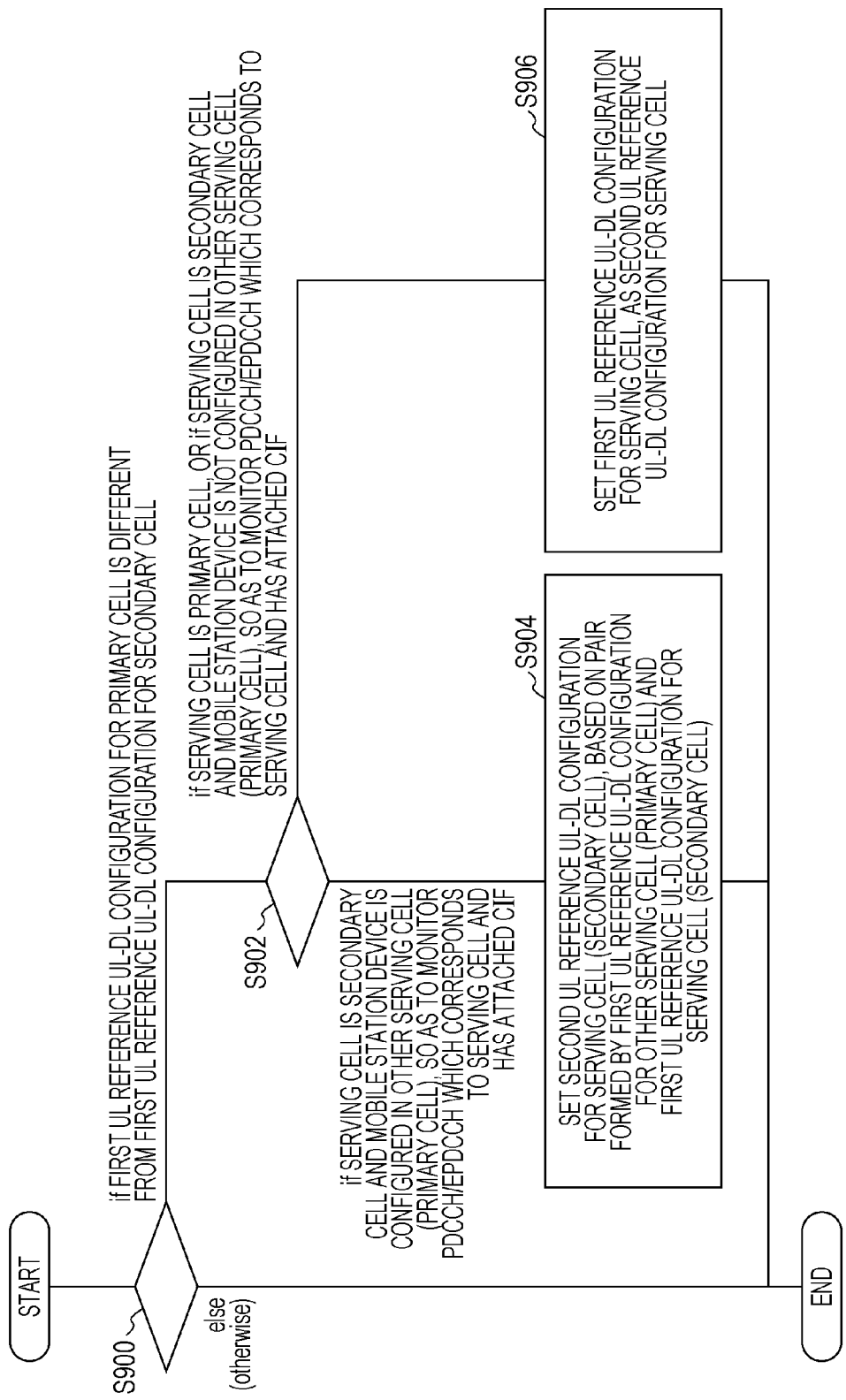
FIG. 9 is a flowchart illustrating a setting method of a second UL reference UL-DL configuration in the embodiment.

FIG. 9 is a flowchart illustrating the setting method of the second UL reference UL-DL configuration in the embodiment. In FIG. 9, one primary cell and one secondary cell are configured for the terminal device 1. The terminal device 1 performs the setting method in FIG. 9, for each of the primary cell and the secondary cell.

The terminal device 1 determines whether or not a first UL reference UL-DL configuration for the primary cell is different from a first UL reference UL-DL configuration for the secondary cell (S900). In a case where the first UL reference UL-DL configuration for the primary cell is the same as the first UL reference UL-DL configuration for the secondary cell, the terminal device 1 does not set the second UL reference UL-DL configuration and ends a setting process for the second UL reference UL-DL configuration.

In a case where the first UL reference UL-DL configuration for the primary cell is different from the first UL reference UL-DL configuration for the secondary cell, the terminal device 1 determines whether a serving cell is the primary cell or the secondary cell, and/or the terminal device 1 is configured so as to monitor a PDCCH/EPDCCH which corresponds to the serving cell and has an attached carrier indicator field (CIF), in another serving cell (S902).

In a case where the serving cell is the secondary cell, and the terminal device 1 is configured so as to monitor the PDCCH/EPDCCH which corresponds to the serving cell (secondary cell) and has an attached carrier indicator field (CIF), in the other serving cell (primary cell), the terminal device 1 sets a second UL reference UL-DL configuration for the serving cell (secondary cell), based on a pair formed by the first UL reference UL-DL configuration for the other serving cell (primary cell) and the first UL reference UL-DL configuration for the serving cell (secondary cell) (S904).

In S904, the terminal device 1 sets the second UL reference UL-DL configuration for the serving cell (secondary cell), based on a table in FIG. 10. FIG. 10 is a diagram illustrating a correspondence between a pair and the second UL reference UL-DL configuration for the secondary cell, in the embodiment. The pair is formed by the first UL reference UL-DL configuration for the other serving cell (primary cell) and the first UL reference UL-DL configuration for the serving cell (secondary cell).

In FIG. 10, the primary cell UL-DL configuration refers to the first UL reference UL-DL configuration for the other serving cell (primary cell). In FIG. 10, the secondary cell UL-DL configuration refers to the first UL reference UL-DL configuration for the serving cell (secondary cell).

For example, in a case where the first UL reference UL-DL configuration 0 is set for the other serving cell (primary cell), and the first UL reference UL-DL configuration 2 is set for the serving cell (secondary cell), the second UL reference UL-DL configuration 1 is set for the secondary cell.

In a case where the serving cell is the primary cell, or the serving cell is the secondary cell, and the terminal device 1 is not configured so as to monitor the PDCCH/EPDCCH which corresponds to the serving cell (secondary cell) and has an attached carrier indicator field (CIF), in the other serving cell (primary cell), the first UL reference UL-DL configuration for the serving cell is set as the second UL reference UL-DL configuration for the serving cell (S906).

The base station apparatus 3 sets the second UL reference UL-DL configuration based on the setting method in FIG. 9.

Monitoring a PDCCH/EPDCCH having an attached CIF means that decoding of the PDCCH or the EPDCCH is examined in accordance with a DCI format including the CIF. The CIF is a field on which a carrier indicator is mapped. The value of the carrier indicator indicates a serving cell corresponding to a DCI format with which the carrier indicator is associated.

In the other serving cell, the terminal device 1 which is configured so as to monitor a PDCCH/EPDCCH which corresponds to the serving cell and has an attached CIF monitors the PDCCH/EPDCCH having an attached CIF in the other serving cell.

In the other serving cell, it is preferable that the terminal device 1 which is configured so as to monitor a PDCCH/EPDCCH which corresponds to the serving cell and has an attached CIF receives the third information for the serving cell on the PDCCH/EPDCCH in the other serving cell.

In the other serving cell, the terminal device 1 which is not configured so as to monitor a PDCCH/EPDCCH which corresponds to the serving cell and has an attached CIF monitors the PDCCH/EPDCCH which has an attached CIF or does not have an attached CIF, in the serving cell.

In the other serving cell, it is preferable that the terminal device 1 which is not configured so as to monitor a PDCCH/EPDCCH which corresponds to the serving cell and has an attached CIF receives the third information for the serving cell on the PDCCH/EPDCCH in the serving cell.

The PDCCH/EPDCCH for the primary cell is transmitted in the primary cell. It is preferable that the third information for the primary cell is transmitted on the PDCCH/EPDCCH of the primary cell.

The base station apparatus 3 transmits a parameter (cif-Presence-r10) to the terminal device 1. The parameter (cif-Presence-r10) indicates whether or not a DCI format transmitted in the primary cell includes a CIF.

The base station apparatus 3 transmits a parameter (CrossCarrierSchedulingConfig-r10) associated with cross carrier scheduling, to the terminal device 1 for each secondary cell.

The parameter (CrossCarrierSchedulingConfig-r10) includes a parameter (schedulingCellInfo-r10) which indicates whether a PDCCH/EPDCCH corresponding to the associated secondary cell is transmitted in the secondary cell or in the other serving cell.

In a case where the parameter (schedulingCellInfo-r10) indicates that the PDCCH/EPDCCH corresponding to the associated secondary cell is transmitted in the secondary cell, the parameter (schedulingCellInfo-r10) includes a parameter (cif-Presence-r10) which indicates whether or not the DCI format transmitted in the secondary cell includes a CIF.

In a case where the parameter (schedulingCellInfo-r10) indicates that the PDCCH/EPDCCH corresponding to the associated secondary cell is transmitted in the other serving cell, the parameter (schedulingCellInfo-r10) includes a parameter (schedulingCellId) which indicates a serving cell in which downlink assignment for the associated secondary cell is transmitted.

A setting method of the second DL reference UL-DL configuration will be described below.

The terminal device 1 and the base station apparatus 3 set the second DL reference UL-DL configuration in a case where a plurality of serving cells is configured for the terminal device 1 and first DL reference LTL-DL configurations for at least two serving cells are different from each other. The base station apparatus 3 and the terminal device 1 may not set the second DL reference UL-DL configuration in cases other than the case where a plurality of serving cells is configured for the terminal device 1 and first DL reference UL-DL configurations for at least two serving cells are different from each other.

The cases other than the case where first DL reference UL-DL configurations for at least two serving cells are different from each other correspond to a case where first DL reference UL-DL configurations for all serving cells are the same as each other. The base station apparatus 3 and the terminal device 1 may not set the second DL reference UL-DL configuration in a case where one serving cell is configured for the terminal device 1.

Figure 11:
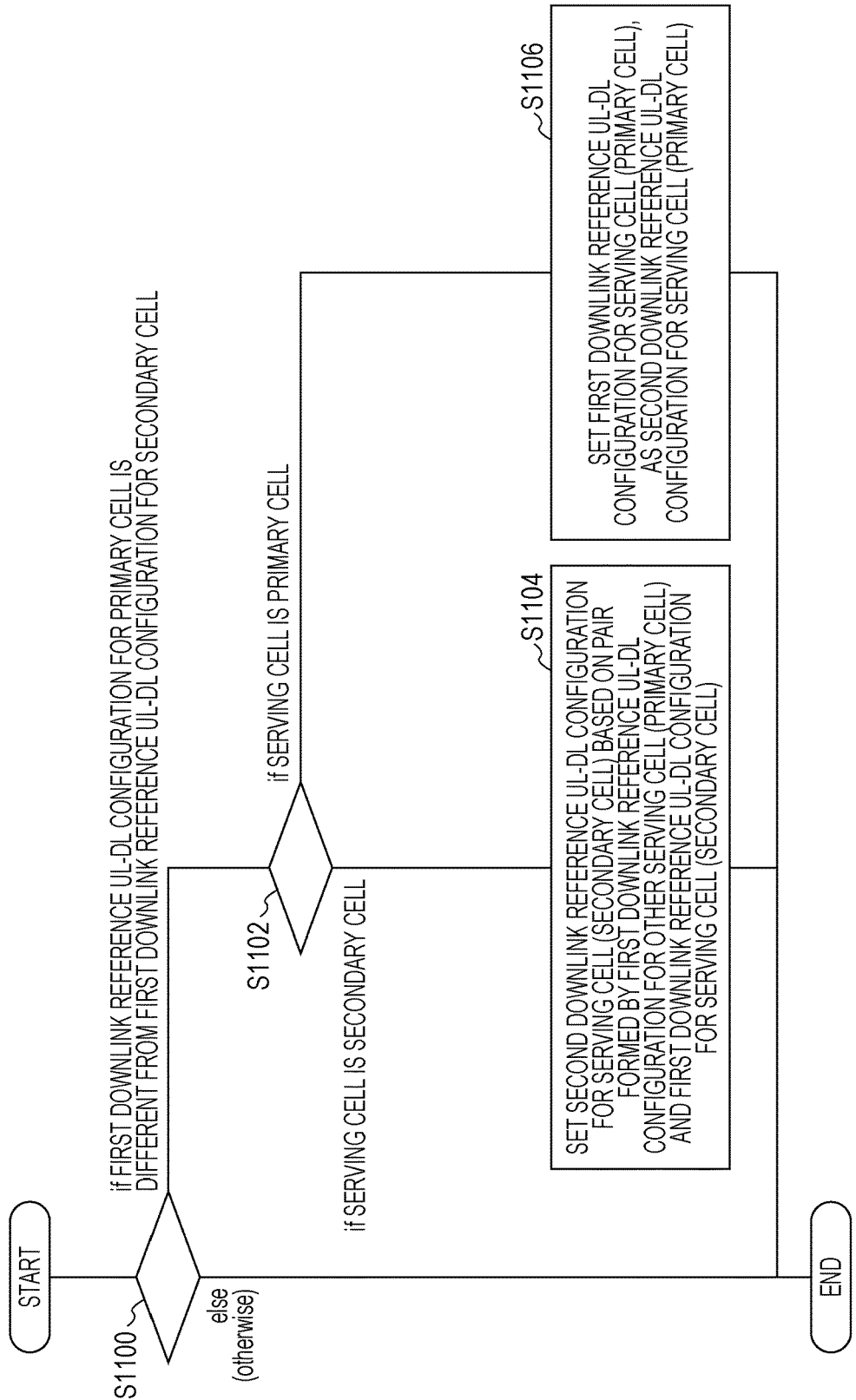
FIG. 11 is a flowchart illustrating a setting method of a second DL reference UL-DL configuration in the embodiment.

FIG. 11 is a flowchart illustrating the setting method of the second DL reference UL-DL configuration in the embodiment. In FIG. 11, one primary cell and one secondary cell are configured for the terminal device 1. The terminal device 1 performs the setting method in FIG. 11, for each of the primary cell and the secondary cell.

The terminal device 1 determines whether or not a first DL reference UL-DL configuration for the primary cell is different from a first DL reference UL-DL configuration for the secondary cell (S1100). In a case where the first DL reference UL-DL configuration for the primary cell is the same as the first DL reference UL-DL configuration for the secondary cell, the terminal device 1 does not set the second DL reference UL-DL configuration and ends a setting process for the second DL reference UL-DL configuration.

In a case where the first DL reference UL-DL configuration for the primary cell is different from the first DL reference UL-DL configuration for the secondary cell, the terminal device 1 determines whether a serving cell is the primary cell or the secondary cell (S1102).

In a case where the serving cell is the secondary cell, the terminal device 1 sets the second UL reference UL-DL configuration for the serving cell (secondary cell), based on a pair formed by a first DL reference UL-DL configuration for the other serving cell (primary cell), and a first DL reference UL-DL configuration for the serving cell (secondary cell) (S1104).

In S1104, the terminal device 1 sets the second DL reference UL-DL configuration for the serving cell (secondary cell), based on a table in FIG. 12. FIG. 12 is a diagram illustrating a correspondence between a pair and the second DL reference UL-DL configuration for the secondary cell in the embodiment. The pair is formed by the first DL reference UL-DL configuration for the primary cell and the first DL reference UL-DL configuration for the secondary cell.

In FIG. 12, the primary cell UL-DL configuration refers to the first DL reference UL-DL configuration for the primary cell. In FIG. 12, the secondary cell UL-DL configuration refers to the first DL reference UL-DL configuration for the secondary cell.

In a case where the pair formed by the first DL reference UL-DL configuration for the primary cell, and the first DL reference UL-DL configuration for the secondary cell belongs to Set 1 in FIG. 12, the second DL reference UL-DL configuration for the secondary cell is defined in Set 1.

In a case where the terminal device 1 is not configured so as to monitor a PDCCH/EPDCCH which corresponds to the secondary cell and has an attached CIF, in the primary cell, and a pair formed by the first DL reference UL-DL configuration for the primary cell and the first DL reference UL-DL configuration for the secondary cell belongs to Set 2 in FIG. 12, the second DL reference UL-DL configuration for the secondary cell is defined in Set 2.

In a case where the terminal device 1 is not configured so as to monitor a PDCCH/EPDCCH which corresponds to the secondary cell and has an attached CIF, in the primary cell, and a pair formed by the first DL reference UL-DL configuration for the primary cell and the first DL reference UL-DL configuration for the secondary cell belongs to Set 3 in FIG. 12, the second DL reference UL-DL configuration for the secondary cell is defined in Set 3.

In a case where the terminal device 1 is configured so as to monitor a PDCCH/EPDCCH which corresponds to the secondary cell and has an attached CIF, in the primary cell, and a pair formed by the first DL reference UL-DL configuration for the primary cell and the first DL reference UL-DL configuration for the secondary cell belongs to Set 4 in FIG. 12, the second DL reference UL-DL configuration for the secondary cell is defined in Set 4.

In a case where the terminal device 1 is configured so as to monitor a PDCCH/EPDCCH which corresponds to the secondary cell and has an attached CIF, in the primary cell, and a pair formed by the first DL reference UL-DL configuration for the primary cell and the first DL reference UL-DL configuration for the secondary cell belongs to Set 5 in FIG. 12, the second DL reference UL-DL configuration for the secondary cell is defined in Set 5.

For example, in a case where the first DL reference UL-DL configuration 1 is set for the primary cell, and the first DL reference UL-DL configuration 0 is set for the secondary cell, the second DL reference UL-DL configuration 1 is set for the secondary cell.

In a case where the serving cell is the primary cell, the first DL reference UL-DL configuration for the serving cell (primary cell) is set as the second DL reference UL-DL configuration for the serving cell (primary cell) (S1106).

The base station apparatus 3 sets the second DL reference UL-DL configuration based on the setting method illustrated in FIG. 11.

The first UL reference UL-DL configuration will be described below.

The first UL reference UL-DL configuration is used at least for specifying a subframe in which transmission of an uplink is possible or impossible in a serving cell.

The terminal device 1 does not transmit an uplink in a subframe that is indicated as a downlink subframe by the first UL reference UL-DL configuration. The terminal device 1 does not transmit an uplink in a DwPTS and a GP of a subframe that is indicated as a special subframe by the first UL reference UL-DL configuration.

The first DL reference UL-DL configuration will be described below.

The first DL reference UL-DL configuration is used at least for specifying a subframe in which transmission of a downlink is possible or impossible in a serving cell.

The terminal device 1 does not transmit a downlink in a subframe that is indicated as an uplink subframe by the first DL reference UL-DL configuration. The terminal device 1 does not transmit a downlink in an UpPTS and a GP of a subframe that is indicated as a special subframe by the first DL reference UL-DL configuration.

The terminal device 1 which sets the first DL reference UL-DL configuration based on the first information may perform measurement by using a downlink signal (for example, measurement relating to channel state information) in a DwPTS of a downlink subframe or a special subframe that is indicated by the first UL reference UL-DL configuration or the first DL reference UL-DL configuration.

A subframe that is indicated as an uplink subframe by the first UL reference UL-DL configuration and indicated as a downlink subframe by the first DL reference UL-DL configuration is also referred to as a first flexible subframe. The first flexible subframe is a subframe reserved for transmitting an uplink and transmitting a downlink.

A subframe that is indicated as a special subframe by the first UL reference UL-DL configuration and indicated as a downlink subframe by the first DL reference UL-DL configuration is also referred to as a second flexible subframe. The second flexible subframe is a subframe reserved for transmitting a downlink. The second flexible subframe is a subframe reserved for transmitting a downlink and in a DwPTS and for transmitting an uplink in an UpPTS.

The transmission-direction UL-DL configuration will be described in detail below.

The terminal device 1 and the base station apparatus 3 set a transmission-direction UL-DL configuration relating to a direction (up/down) of transmission in a subframe. The transmission-direction UL-DL configuration is used for determining a direction of transmission in a subframe.

The terminal device 1 controls transmission in the first flexible subframe and the second flexible subframe based on scheduling information (DCI format and/or HARQ-ACK) and the transmission-direction UL-DL configuration.

The base station apparatus 3 transmits third information indicating the transmission-direction UL-DL configuration, to the terminal device 1. The third information is information for an instruction of a subframe in which transmission of an uplink is allowed. The third information is information for an instruction of a subframe in which transmission of a downlink is allowed. The third information is information for an instruction of a subframe in which transmission of an uplink in an UpPTS and transmission of a downlink in a DwPTS are allowed. The transmission-direction UL-DL configuration is used for specifying a direction of transmission in a subframe of which an instruction performed by the first UL reference UL-DL configuration is different from an instruction performed by the first DL reference UL-DL configuration.

The base station apparatus 3 may perform scheduling of transmission of a downlink in a subframe of which an instruction as a downlink subframe is performed by the transmission-direction UL-DL configuration. The terminal device 1 may perform reception processing of a downlink signal in the subframe of which an instruction as a downlink subframe is performed by the transmission-direction UL-DL configuration.

The base station apparatus 3 may perform scheduling of transmission of an uplink in a subframe of which an instruction as an uplink subframe is performed by the transmission-direction UL-DL configuration. The terminal device 1 may perform transmission processing of an uplink signal in the subframe of which an instruction as an uplink subframe is performed by the transmission-direction UL-DL configuration.

The base station apparatus 3 may perform scheduling of transmission of a downlink in a DwPTS of a subframe of which an instruction as a special subframe is performed by the transmission-direction UL-DL configuration. The terminal device 1 may perform reception processing of a downlink signal in the DwPTS of the subframe of which an instruction as a special subframe is performed by the transmission-direction UL-DL configuration.

The base station apparatus 3 may perform scheduling of transmission of an SRS in an UpPTS of a subframe of which an instruction as a special subframe is performed by the transmission-direction UL-DL configuration. The terminal device 1 may perform transmission processing of an SRS in the UpPTS of the subframe of which an instruction as a special subframe is performed by the transmission-direction UL-DL configuration.

The first UL reference UL-DL configuration and the second UL reference UL-DL configuration will be described in detail below.

The first UL reference UL-DL configuration and the second UL reference UL-DL configuration are used for specifying (selecting, determining) a correspondence between a subframe n to which a PDCCH/EPDCCH/PHICH is allocated, and a subframe (n+k) to which a PUSCH corresponding to the PDCCH/EPDCCH/PHICH is allocated.

In a case where one primary cell is configured, or in a case where one primary cell and one secondary cell are configured and the first UL reference UL-DL configuration for the primary cell is the same as the first UL reference UL-DL configuration for the secondary cell, in each of the two serving cells, the corresponding first UL reference UL-DL configuration is used for determining a correspondence between a subframe to which a PDCCH/EPDCCH/PHICH is allocated, and a subframe to which a PUSCH corresponding to the PDCCH/EPDCCH/PHICH is allocated.

In a case where one primary cell and one secondary cell are configured, and the first UL reference UL-DL configuration for the primary cell is different from the first UL reference UL-DL configuration for the secondary cell, in each of the two serving cells, the corresponding second UL reference UL-DL configuration is used for determining a correspondence between a subframe to which a PDCCH/EPDCCH/PHICH is allocated, and a subframe to which a PUSCH corresponding to the PDCCH/EPDCCH/PHICH is allocated.

FIG. 13 is a diagram illustrating a correspondence between a subframe n in which a PDCCH/EPDCCH/PHICH is allocated, and a subframe (n+k) in which a PUSCH corresponding to the PDCCH/EPDCCH/PHICH is allocated, in the embodiment. The terminal device 1 specifies (selects, determines) a value of k in accordance with the table in FIG. 13.

In FIG. 13, in a case where one primary cell is configured or in a case where one primary cell and one secondary cell are configured, and the first UL reference UL-DL configuration for the primary cell is the same as the first UL reference UL-DL configuration for the secondary cell, the UL-DL configuration refers to the first UL reference UL-DL configuration.

In FIG. 13, in a case where one primary cell and one secondary cell are configured, and the first UL reference UL-DL configuration for the primary cell is different from the first UL reference UL-DL configuration for the secondary cell, the UL-DL configuration refers to the second UL reference UL-DL configuration.

In the following descriptions, in FIG. 13, the first UL reference UL-DL configuration and the second UL reference UL-DL configuration are simply referred to as an UL-DL configuration.

In a case where the terminal device 1 detects a PDCCH/EPDCCH which corresponds to a serving cell in which UL-DL configurations 1 to 6 are set, and has an attached uplink grant in which the terminal device 1 is set as a target, in a subframe n, the terminal device 1 performs PUSCH transmission in accordance with the uplink grant, in a subframe (n+k) specified (selected, determined) based on the table in FIG. 13.

In a case where the terminal device 1 detects a PHICH which corresponds to a serving cell in which UL-DL configurations 1 to 6 are set, and has attached NACK in which the terminal device 1 is set as a target, in a subframe n, the terminal device 1 performs PUSCH transmission in a subframe (n+k) specified (selected, determined) based on the table in FIG. 13.

An uplink grant which corresponds to a serving cell in which the UL-DL configuration 0 is configured and which sets the terminal device 1 as a target includes a 2-bit uplink index (UL index). An uplink grant which corresponds to a serving cell in which UL-DL configurations 1 to 6 are configured, and which sets the terminal device 1 as a target does not include the uplink index (UL index).

In a case where the most significant bit (MSB) of the uplink index included in the uplink grant which corresponds to a serving cell in which the UL-DL configuration 0 is set is set to 1, in the subframe n, the terminal device 1 adjusts PUSCH transmission in accordance with the uplink grant, in the subframe (n+k) specified (selected, determined) based on the table in FIG. 13.

In a case where the terminal device 1 receives a PHICH having attached NACK which corresponds to a serving cell in which the UL-DL configuration 0 is set in a first resource set in the subframe n=0 or 5, the terminal device 1 adjusts PUSCH transmission in accordance with the PHICH, in the subframe (n+k) specified (selected, determined) based on the table in FIG. 13.

In a case where the least significant bit (LSB) of the uplink index included in the uplink grant which corresponds to a serving cell in which the UL-DL configuration 0 is set is set to 1, in the subframe n, the terminal device 1 adjusts PUSCH transmission in accordance with the uplink grant, in a subframe (n+7).

In a case where the terminal device 1 receives a PHICH having attached NACK which corresponds to a serving cell in which the UL-DL configuration 0 is set, in a second resource set in the subframe n=0 or 5 the terminal device 1 adjusts PUSCH transmission in accordance with the uplink grant, in the subframe (n+7).

In a case where the terminal device 1 receives a PHICH having attached NACK which corresponds to a serving cell in which the UL-DL configuration 0 is set, in the subframe n=1 or 6, the terminal device 1 adjusts PUSCH transmission in accordance with the uplink grant, in the subframe (n+7).

For example, in a case where the terminal device 1 detects a PDCCH/EPDCCH/PHICH corresponding to a serving cell in which the UL-DL configuration 0 is set, in [SFN=m, subframe 1], the terminal device 1 adjusts transmission of a PUSCH in a subframe [SFN=m subframe 7] after six subframes.

The first UL reference UL-DL configuration and the second UL reference UL-DL configuration are used for specifying (selecting, determining) a correspondence between a subframe n to which a PUSCH is allocated, and a subframe (n+k) to which a PHICH corresponding to the PUSCH is allocated.

In a case where one primary cell is configured or in a case where one primary cell and one secondary cell are configured and the first UL reference UL-DL configuration for the primary cell is the same as the first UL reference UL-DL configuration for the secondary cell, in each of the two serving cells, the corresponding first UL reference UL-DL configuration is used for specifying (selecting, determining) a correspondence between the subframe n to which a PUSCH is allocated, and the subframe (n+k) to which a PHICH corresponding to the PUSCH is allocated.

In a case where one primary cell and one secondary cell are configured, and the first UL reference UL-DL configuration for the primary cell is different from the first UL reference UL-DL configuration for the secondary cell, in each of the two serving cells, the corresponding second UL reference UL-DL configuration is used for specifying (selecting, determining) a correspondence between the subframe n to which a PUSCH is allocated, and the subframe (n+k) to which a PHICH corresponding to the PUSCH is allocated.

FIG. 14 is a diagram illustrating a correspondence between a subframe n to which a PUSCH is allocated, and a subframe (n+k) to which a PHICH corresponding to the PUSCH is allocated, in the embodiment. The terminal device 1 specifies (selects, determines) a value of k in accordance with the table in FIG. 14.

In FIG. 14, in a case where one primary cell is configured or in a case where one primary cell and one secondary cell are configured and the first UL reference UL-DL configuration for the primary cell is the same as the first UL reference UL-DL configuration for the secondary cell, the UL-DL configuration refers to the first UL reference UL-DL configuration.

In FIG. 14, in a case where one primary cell and one secondary cell are configured and the first UL reference UL-DL configuration for the primary cell is different from the first UL reference UL-DL configuration for the secondary cell, the UL-DL configuration refers to the second UL reference UL-DL configuration.

In the following descriptions for FIG. 14, the first UL reference UL-DL configuration and the second UL reference UL-DL configuration are simply referred to as UL-DL configurations.

In a case where transmission on a PUSCH is scheduled in the subframe n, the terminal device 1 determines a PHICH resource in the subframe (n+k) specified based on the table in FIG. 14.

For example, in a case where PUSCH transmission is scheduled for a serving cell in which the UL-DL configuration 0 is set, in [SFN=m, subframe n=2], the PHICH resource is determined in [SFN=m, subframe n=6].

The first DL reference UL-DL configuration and the second DL reference UL-DL configuration will be described in detail below.

The first DL reference UL-DL configuration and the second DL reference UL-DL configuration are used for specifying (selecting, determining) a correspondence between a subframe n to which a PDSCH is allocated, and a subframe (n+k) to which HARQ-ACK corresponding to the PDSCH is transmitted.

In a case where one primary cell is configured or in a case where one primary cell and one secondary cell are configured and the first DL reference UL-DL configuration for the primary cell is the same as the first DL reference UL-DL configuration for the secondary cell, in each of the two serving cells, the corresponding first DL reference UL-DL configuration is used for specifying (selecting, determining) a correspondence between the subframe n to which a PDSCH is allocated, and the subframe (n+k) to which HARQ-ACK corresponding to the PDSCH is transmitted.

In a case where one primary cell and one secondary cell are configured and the first DL reference UL-DL configuration for the primary cell is different from the first DL reference UL-DL configuration for the secondary cell, in each of the two serving cells, the corresponding second DL reference UL-DL configuration is used for specifying (selecting, determining) a correspondence between the subframe n to which a PDSCH is allocated, and the subframe (n+k) to which HARQ-ACK corresponding to the PDSCH is transmitted.

FIG. 15 is a diagram illustrating a correspondence between a subframe (n−k) in which a PDSCH is allocated, and a subframe n in which HARQ-ACK corresponding to the PDSCH is allocated, in the embodiment. The terminal device 1 specifies (selects, determines) a value of k in accordance with the table in FIG. 15.

In FIG. 15, in a case where one primary cell is configured, or in a case where one primary cell and one secondary cell are configured and the first DL reference UL-DL configuration for the primary cell is the same as the first DL reference UL-DL configuration for the secondary cell, the LTL-DL configuration refers to the first DL reference UL-DL configuration.

In FIG. 15, in a case where one primary cell and one secondary cell are configured and the first DL reference UL-DL configuration for the primary cell is different from the first DL reference UL-DL configuration for the secondary cell, the UL-DL configuration refers to the second DL reference UL-DL configuration.

In the following descriptions for FIG. 15, the first DL reference UL-DL configuration and the second DL reference UL-DL configuration are simply referred to as UL-DL configurations.

In a case where the terminal device 1 detects PDSCH transmission in which the terminal device 1 is set as a target and transmission of the corresponding HARQ-ACK is required, in a subframe (n−k) (k is specified by the table in FIG. 15) of a serving cell, the terminal device 1 transmits HARQ-ACK in a subframe n.

For example, the terminal device 1 does not perform a response of HARQ-ACK to the PDSCH transmission, which is used when system information is transmitted. For example, the terminal device 1 performs a response of HARQ-ACK to the PDSCH transmission which is scheduled by a DCI format which has attached CRC scrambled by a C-RNTI.

For example, the terminal device 1 transmits HARQ-ACK in response to the PDSCH received in a subframe (n−6) and/or (n−7), in a serving cell in which the UL-DL configuration 1 is set in the subframe n=2.

The first DL reference UL-DL configuration may not be configured for a serving cell in which the second information is not received. In this case, the terminal device 1 and the base station apparatus 3 may perform a process which is performed based on the above-described first DL reference UL-DL configuration, based on the first UL reference UL-DL configuration (serving cell UL-DL configuration). The serving cell in which the second information is not received is a serving cell in which dynamic TDD is not configured.

For example, in a case where one primary cell and one secondary cell are configured, the second information for the secondary cell is received without receiving the second information for the primary cell, the first UL reference UL-DL configuration (serving cell UL-DL configuration) for the primary cell is different from the first DL reference UL-DL configuration for the secondary cell, and the serving cell is the secondary cell, the second DL reference UL-DL configuration for the serving cell (secondary cell) may be set based on a pair formed by the first DL reference UL-DL configuration for the other serving cell (primary cell) and the first UL reference UL-DL configuration for the serving cell (secondary cell).

For example, in a case where one primary cell and one secondary cell are configured, the second information for the secondary cell is received without receiving the second information for the primary cell, the first UL reference UL-DL configuration (serving cell UL-DL configuration) for the primary cell is different from the first DL reference UL-DL configuration for the secondary cell, in each of the two serving cells, the corresponding second DL reference UL-DL configuration may be used for specifying (selecting, determining) a correspondence between a subframe n to which a PDSCH is allocated, and a subframe (n+k) to which HARQ-ACK corresponding to the PDSCH is transmitted.

For example, in a case where one primary cell and one secondary cell are configured, second information for the secondary cell is received without receiving second information for the primary cell, and the first UL reference UL-DL configuration (serving cell UL-DL configuration) for the primary cell is the same as the first DL reference UL-DL configuration for the secondary cell, in the primary cell, the corresponding first UL reference UL-DL configuration (serving cell UL-DL configuration) may be used for specifying (selecting, determining) a correspondence between the subframe n to which a PDSCH is allocated, and the subframe (n+k) to which HARQ-ACK corresponding to the PDSCH is transmitted. In this case, in the secondary cell, the corresponding first DL reference UL-DL configuration may be used for specifying (selecting, determining) a correspondence between the subframe n to which a PDSCH is allocated, and the subframe (n+k) to which HARQ-ACK corresponding to the PDSCH is transmitted.

For example, in a case where one primary cell and one secondary cell are configured, second information for the secondary cell is received without receiving second information for the primary cell, and the first UL reference UL-DL configuration (serving cell UL-DL configuration) for the primary cell is different from the first DL reference UL-DL configuration for the secondary cell, in FIGS. 10 and 12, the primary cell UL-DL configuration refers to the first UL reference UL-DL configuration for the primary cell.

Transmission power control (TPC) for transmission on a PUSCH in the embodiment will be described.

In a case where transmission on a PUSCH is performed without simultaneously performing transmission on a PUCCH, the terminal device 1 may set a transmission power value for transmission on a PUSCH for a certain cell c in a certain subframe based on an expression (1).

$$P_{PUSCH,c}(i) = \min\{P_{CMAX,C}(i), P_{real,c}(i)\} \text{ [dBm]} \quad \text{[Expression 1]}$$

In a case where transmission on a PUCCH and transmission on a PUSCH are simultaneously performed, the terminal device 1 may set a transmission power value for transmission on the PUSCH for a certain cell c in a certain subframe i, based on an expression (2)

$$P_{PUSCH,c}(i) = \min\{10 \log_{10}(P_{CMAX,C}(i) - P_{PUCCH,c}(i)), P_{real,c}(i)\} \text{ [dBm]} \quad \text{[Expression 2]}$$

$P_{real,c}(i)$ in the expression (1) and the expression (2) is defined based on an expression (3).

$$P_{real,c}(i) = 10 \log_{10}(M_{PUSCH,c}(i) + P_{O\_PUSCH,c}(j) + \alpha_c(j) \cdot PL_c + \Delta_{TF,c}((i) + f_c(i)) \quad \text{[Expression 3]}$$

$P_{real,c}(i)$ is a power value calculated (estimated) based on real transmission of a PUSCH in a cell c. Calculation (estimation) of the power value based on real transmission for a PUSCH in a cell c includes the meaning that the power value is calculated (estimated) based on real transmission on the PUSCH.

In a case where transmission on a PUSCH is not performed, the terminal device 1 may assume the transmission power value for transmission on a PUSCH for a certain cell c in a certain subframe i, based on an expression (4). The assumption is performed in order to accumulate TPC commands which are received for the PUSCH through the DCI format 3/3A. $P_{reference,c}(i)$ in the expression (4) is defined based on an expression (5).

$$P_{PUSCH,c}(i) = \min\{P_{CMAX,C}(i), P_{reference,c}(i)\} \text{ [dBm]} \quad \text{[Expression 4]}$$

$$P_{reference,c}(i) = P_{O\_PUSCH,c}(1) + \alpha_c(1) \cdot PL_c + f_c(i) \quad \text{[Expression 5]}$$

$P_{reference,c}(i)$ is a power value calculated (estimated) based on a reference format for a PUSCH. Here, calculation (estimation) of the power value based on the reference format for a PUSCH includes the meaning that the power value is calculated (estimated) on the assumption of transmission on a PUSCH by using the reference format.

That is, transmission on a PUSCH in a certain subframe i by using $M_{PUSCH,c}=1$ is assumed as the reference format for a PUSCH. $P_{O\_PUSCH,c}(1)$ is assumed as the reference format for a PUSCH. $\alpha_c(1)$ is assumed as the reference format for a PUSCH. $\Delta_{TF,c}(i)=0$ is assumed as the reference format for a PUSCH.

In a case where the terminal device 1 does not perform transmission on a PUCCH and a PUSCH for a certain cell c in a subframe i, the terminal device 1 may calculate $P_{CMAX,c}$ in the expression (5) on the assumption that Maximum Power Reduction (MPR)=0 dB, Additional Maximum Power Reduction (A-MPR)=0 dB, Power management Maximum Power Reduction (P-MPR)=0 dB, and $\Delta T_C=0$ dB. The calculation is performed in order to accumulate TPC commands which are received for a PUSCH through the DCI format 3/3A. Here, MPR, A-MPR, P-MPR, and $\Delta T_C$ are parameters used for setting a value of $P_{CMAX,c}$.

Here, $P_{PUSCH,c}(i)$ indicates a transmission power value for transmission on a PUSCH in the i-th subframe. min {X, Y} is a function for selecting the minimum value of X and Y. $P_{CMAX,c}$ indicates the maximum transmission power value (also referred to as maximum output power value), and is configured by the terminal device 1.

$p_{CMAX,c}$ indicates the liner value of $P_{CMAX,c}$. $p_{PUCCH}$ indicates the liner value of $P_{PUCCH}(i)$. $P_{PUCCH}(i)$ will be described later.

$M_{PUSCH,c}$ indicates resources (for example, bandwidth) of a PUSCH, which are allocated by the base station apparatus 3. $M_{PUSCH,c}$ is expressed by the number of resource blocks.

$P_{O\_PUSCH,c}(j)$ is a parameter indicating transmission power which functions as a base for transmission on a PUSCH. For example, $P_{O\_PUSCH,c}(j)$ is constituted by the sum of a cell-specific parameter $P_{O\_NOMINAL\_PUSCH,c}(j)$ of which an instruction is performed from a higher layer, and an UE-specific parameter $P_{O\_UE\_PUSCH,c}(j)$ of which an instruction is performed from a higher layer. Here, j is 0 for PUSCH transmission corresponding to an uplink grant (semi-persistent grant) which has an attached SPS C-RNTI. j is 1 for PUSCH transmission corresponding to an uplink grant (dynamic scheduled grant) which has an attached C-RNTI.

$PL_c$ indicates estimation of path loss of a downlink for a certain cell c and is calculated in the terminal device 1.

$\alpha_c$ indicates a coefficient multiplied by path loss for a certain cell c, and an instruction of $\alpha_c$ is performed from the higher layer.

$\Delta_{TF,c}(i)$ indicates an offset value by a modulation scheme/coding rate/resource utilization efficiency and the like. The terminal device 1 calculates $\Delta_{TF,c}(i)$ based on the number of bits of uplink data (UL-SCH) transmitted on a PUSCH or the number of bits of a CQI/PMI, the number of resource elements for PUSCH initial transmission, and the like.

The current state of power control adjustment for transmission on a PUSCH (PUSCH power control adjustment state) is given by $f_c(i)$. Here, whether accumulation for LAO is enabled or disabled is given by a higher layer, based on a parameter (Accumulation-enabled).

In a case where accumulation is enabled based on the parameter (Accumulation-enabled) given from the higher layer, the terminal device 1 sets the value of $f_c(i)$ based on an expression (6).

$f_c(i)=f_c(i-1)+\delta_{PUSCH,c}(i-K_{PUSCH})$ if accumulation is enabled    [Expression 6]

Here, $\delta_{PUSCH,c}$ is a correction value and is referred to as a TPC command. That is, in a case where accumulation is enabled based on the parameter (Accumulation-enabled) given from the higher layer, $\delta_{PUSCH,c}(i-K_{PUSCH})$ indicates a value obtained by accumulation in $f_c(i-1)$. Here, an instruction of $\delta_{PUSCH,c}(i-K_{PUSCH})$ is performed based on a value which is set in a field of a TPC command for a PUSCH. The TPC command for a PUSCH is received in a certain subframe $(i-K_{PUSCH})$ and is included in an uplink grant for a certain cell and the DCI format 3/3A for a PUSCH.

For example, a value set in the field (2-bit information field) of a TPC command for a PUSCH, which is included in an uplink grant (DCI format 0 or DCI format 4) and the DCI format 3 for a PUSCH is mapped on {1, 0, 1, 3} which are accumulated correction values. For example, a value set in the field (1-bit information field) of a TPC command for a PUSCH, which is included in the DCI format 3A for a PUSCH is mapped on {-1, 1} which are accumulated correction values.

In a case where the UL-DL configuration 0 is provided, PUSCH transmission in the subframe 2 or 7 is scheduled by an uplink grant, and the LSB of an uplink index included in the uplink grant is set to 1, the value of $K_{PUSCH}$ is 7.

In cases other than the case where the UL-DL configuration 0 is provided, PUSCH transmission in the subframe 2 or 7 is scheduled by an uplink grant, and the LSB of an uplink index included in the uplink grant is set to 1, the value of $K_{PUSCH}$ is given by the table in FIG. 16. FIG. 16 is a diagram illustrating the value of $K_{PUSCH}$ in the embodiment.

In FIG. 16, in a case where one primary cell is configured or in a case where one primary cell and one secondary cell are configured, and the first UL reference UL-DL configuration for the primary cell is the same as the first UL reference UL-DL configuration for the secondary cell, the UL-DL configuration refers to the first UL reference UL-DL configuration.

That is, in a case where one primary cell is configured or in a case where one primary cell and one secondary cell are configured, and the first UL reference UL-DL configuration for the primary cell is the same as the first UL reference UL-DL configuration for the secondary cell, in each of the two serving cells, the first UL reference UL-DL configurations corresponding to the two serving cells are used for specifying a correspondence between a subframe $(n-K_{PUSCH})$ in which a TPC command for a PUSCH is transmitted and received, and a subframe n in which the TPC command is applied.

In FIG. 16, in a case where one primary cell and one secondary cell are configured, and the first UL reference UL-DL configuration for the primary cell is different from the first UL reference UL-DL configuration for the secondary cell, the UL-DL configuration refers to the second UL reference UL-DL configuration.

That is, in a case where one primary cell and one secondary cell are configured, and the first UL reference UL-DL configuration for the primary cell is different from the first UL reference UL-DL configuration for the secondary cell, in each of the two serving cells, the second UL reference UL-DL configurations corresponding to the two serving cells are used for specifying a correspondence between a subframe $(n-K_{PUSCH})$ in which a TPC command for a PUSCH is transmitted and received, and a subframe n in which the TPC command is applied.

For example, in a case where a TPC command for a PUSCH is received in [SFN=m, subframe n=4] for a serving cell in which the UL-DL configuration 1 is set, the terminal device 1 applies the TPC command for the PUSCH in [SFN=m, subframe n=8].

If accumulation is enabled based on the parameter (Accumulation-enabled) given from the higher layer, and a subframe i is a subframe that is not indicated as an uplink subframe by the first UL reference UL-DL configuration (serving cell UL-DL configuration) for a cell c, $\delta_{PUSCH,c}(i-K_{PUSCH})$ in the expression (6) is 0 dB. $\delta_{PUSCH,c}(i-K_{PUSCH})$ is $\delta_{PUSCH,c}$ for the subframe i.

In a case where the accumulation is disable based on the parameter (Accumulation-enabled) which is given from the higher layer (that is, in a case where the accumulation is not enabled), the terminal device 1 sets the value of $f_c(i)$ based on the value of an expression (7).

$f_c(i)=\delta_{PUSCH,c}(i-K_{PUSCH})$ if accumulation is not enabled    [Expression 7]

That is, in a case where the accumulation is disable based on the parameter (Accumulation-enabled) given from the higher layer, $\delta_{PUSCH,c}(i-K_{PUSCH})$ indicates an absolute value for $f_c(i)$. That is, $\delta_{PUSCH,c}(i-K_{PUSCH})$ may be enabled only for a subframe i.

For example, a value set in the field (2-bit information field) of a TPC command for a PUSCH, which is included in the uplink grant (DCI format 0 or DCI format 4) is mapped on {-4, -1, 1, 4} which are absolute values.

In a case where the accumulation is disable based on the parameter (Accumulation-enabled) which is given from the higher layer, the DCI format 3/3A may not be used for transmission power control for transmission on a PUSCH.

If the accumulation is not enabled based on the parameter (Accumulation-enabled) which is given from the higher layer, and the subframe i is a subframe that is not indicated as an uplink subframe by the first UL reference UL-DL configuration (serving cell UL-DL configuration) for the cell c, the value of $f_c(i)$ in the expression (7) is the same as the value of $f_c(i-1)$ (that is, $f_c(i)=f_c(i-1)$).

Transmission power control for transmission on a PUCCH in the embodiment will be described below.

In a case where the terminal device 1 performs transmission on a PUCCH, the terminal device 1 sets a transmission power value for transmission on a PUCCH for a certain cell c in a certain subframe i, based on an expression (8). $P_{real\_PUCCH}(i)$ in the expression (8) is defined based on an expression (9).

$$P_{PUCCH,c}(i)=\min\{P_{CMAX,C}, P_{real\_PUCCH,c}(i)\} \text{ [dBm]} \quad \text{[Expression 8]}$$

$$P_{real\_PUCCH,c}(i)=P_{O\_PUCCH,c}+PL_c\pm h(n_{CQI}, n_{HARQ})+\Delta_{F\_PUCCH}(F)+g(i) \quad \text{[Expression 9]}$$

Here, $P_{real\_PUCCH,c}(i)$ is a power value calculated (estimated) based on real transmission of a PUCCH. Calculation (estimation) of the power value based on real transmission for a PUCCH in a cell c includes the meaning that the power value is calculated (estimated) based on real transmission on the PUCCH.

In a case where the terminal device 1 does not perform transmission on a PUCCH for a primary cell, the terminal device 1 may assume the transmission power value for transmission on a PUCCH in a certain subframe i, based on an expression (10). The assumption is performed in order to accumulate TPC commands which are received for the PUCCH through the DCI format 3/3A. $P_{reference,c}(i)$ in the expression (10) is defined based on an expression (11).

$$P_{PUCCH,c}(i)=\min\{P_{CMAX,C}, P_{reference\_PUCCH,c}(i)\} \text{ [dBm]} \quad \text{[Expression 10]}$$

$$P_{reference\_PUCCH,c}(i)=P_{O\_PUCCH,c}+PL_c+g(i) \quad \text{[Expression 11]}$$

$P_{reference\_PUCCH,c}(i)$ is a power value calculated (estimated) based on a reference format for a PUCCH. Here, calculation (estimation) of the power value based on the reference format for a PUCCH includes the meaning that the power value is calculated (estimated) on the assumption of transmission on a PUCCH by using the reference format.

That is, $h(n_{CQI}, n_{HARQ})=0$ is assumed as the reference format for a PUCCH. $\Delta_{F\_PUCCH}(F)=0$ is assumed as the reference format for a PUCCH. PUCCH format 1a is assumed as the reference format for a PUCCH.

In a case where the terminal device 1 does not perform transmission on a PUCCH and a PUSCH for a certain cell c in a subframe i, the terminal device 1 may calculate $P_{CMAX,c}$ in the expression (10) on the assumption of MPR=0 dB, A-MPR=0 dB, P-MPR=0 dB, and $\Delta T_C$=0 dB. The calculation is performed in order to accumulate TPC commands which are received for a PUCCH through the DCI format 3/3A.

Here, $P_{PUCCH,c}(i)$ indicates a transmission power value for transmission on a PUCCH in the i-th subframe. $P_{O\_PUCCH,c}$ is a parameter indicating transmission power which functions as a base for transmission on a PUCCH. An instruction of $P_{O\_PUCCH,c}$ is performed from the higher layer.

$h(n_{CQI}, n_{HARQ})$ is a value which is calculated based on the number of bits transmitted on a PUCCH and the format of the PUCCH. Here, $n_{NQI}$ indicates the number of bits of channel state information transmitted on the PUCCH. $n_{HARQ}$ indicates the number of bits of HARQ-ACK transmitted on the PUCCH.

$\Delta_{F\_PUCCH}(F)$ is an offset value of which an instruction is performed from the higher layer for each format of a PUCCH. For example, $\Delta_{F\_PUCCH}(F)$ for the PUCCH format 1a is normally 0.

The terminal device 1 may set the value of g(i) based on an expression (12).

$$g(i)=g(i-1)+\delta_{PUCCH}(i-K_{PUCCH}) \quad \text{[Expression 12]}$$

Here, $\delta_{PUCCH}$ is a correction value and is referred to as a TPC command. That is, $\delta_{PUCCH}(i-K_{PUCCH})$ indicates a value obtained by accumulation in g(i-1). An instruction of $\delta_{PUCCH}(i-K_{PUCCH})$ is performed based on a value which is set in a field of a TPC command for a PUCCH. The TPC command for a PUCCH is received in a certain subframe (i-$K_{PUCCH}$) and is included in a downlink grant for a certain cell and the DCI format 3/3A for a PUSCH.

For example, a value set in the field (2-bit information field) of a TPC command for a PUCCH, which is included in a downlink grant and the DCI format 3 for a PUCCH is mapped on {-1, 0, 1, 3} which are accumulated correction values. For example, a value set in the field (1-bit information field) of a TPC command for a PUCCH, which is included in the DCI format 3A for a PUCCH is mapped on {-1, 1} which are accumulated correction values.

The value of $K_{PUCCH}$ is given by the table in FIG. 15.

In FIG. 15, in a case where one primary cell is configured or in a case where one primary cell and one secondary cell are configured, and the first DL reference UL-DL configuration for the primary cell is the same as the first DL reference UL-DL configuration for the secondary cell, the UL-DL configuration refers to the first DL reference UL-DL configuration.

That is, in a case where one primary cell is configured or in a case where one primary cell and one secondary cell are configured, and the first DL reference UL-DL configuration for the primary cell is the same as the first DL reference UL-DL configuration for the secondary cell, the first DL reference UL-DL configuration corresponding to the primary cell is used for specifying a correspondence between a subframe (n-$K_{PUCCH}$) in which a TPC command for a PUCCH is transmitted and received, and a subframe n in which the TPC command is applied.

In FIG. 15, in a case where one primary cell and one secondary cell are configured, and the first DL reference UL-DL configuration for the primary cell is different from the first DL reference UL-DL configuration for the secondary cell, the UL-DL configuration refers to the second DL reference UL-DL configuration.

That is, in a case where one primary cell and one secondary cell are configured, and the first DL reference UL-DL configuration for the primary cell is different from the first DL reference UL-DL configuration for the secondary cell, the second DL reference UL-DL configuration corresponding to the primary cell is used for specifying a correspondence between a subframe (n-$K_{PUCCH}$) in which a TPC command for a PUCCH is transmitted and received and a subframe n in which the TPC command is applied.

In FIG. 15, in a case where the first DL reference UL-DL configuration is not set for the primary cell, the UL-DL configuration refers to the first UL reference UL-DL configuration (serving cell UL-DL configuration) for the primary cell.

In FIG. 15, in a case where one primary cell and one secondary cell are configured, the first DL reference UL-DL configuration is not set for the primary cell, and the first UL reference UL-DL configuration (serving cell UL-DL configuration) for the primary cell is different from the first DL reference UL-DL configuration for the secondary cell, the UL-DL configuration may refer to the second DL reference UL-DL configuration.

For example, in a case where two TPC commands for a PUCCH are received in [SFN=m, subframe n=0, 1] for a serving cell in which the UL-DL configuration 1 is set, the terminal device 1 applies the two TPC commands for the PUCCH in [SFN=m, subframe n=7].

If the first DL reference UL-DL configuration is set for the primary cell, and a subframe i is a subframe that is not indicated as an uplink subframe by the first DL reference UL-DL configuration for the primary cell, the value of g(i) in the expression (12) is the same as the value of g(i−1) (that is, g(i)=g(i−1)).

If the first DL reference UL-DL configuration is not set for the primary cell, and a subframe i is a subframe that is not indicated as an uplink subframe by the first UL reference UL-DL configuration (serving cell UL-DL configuration) for the primary cell, the value of g(i) in the expression (12) is the same as the value of g(i−1).

Here, transmission on a PUCCH may be performed only in the primary cell.

Figure 17:
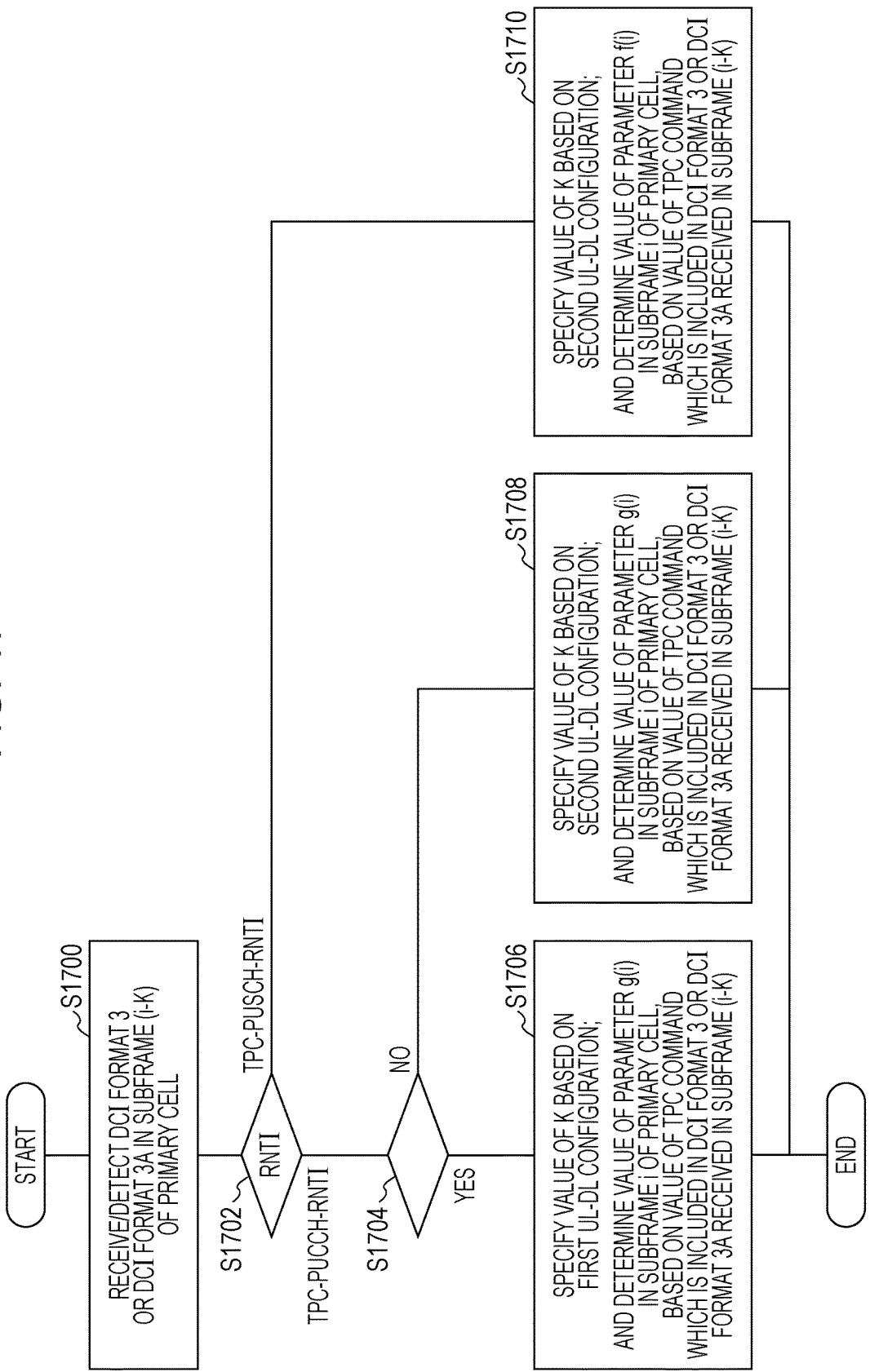
FIG. 17 is a flowchart illustrating an example of a transmission power control method using DCI format 3/3A in the embodiment.

FIG. 17 is a flowchart illustrating an example of a transmission power control method using the DCI format 3/3A, in the embodiment.

The terminal device 1 receives/detects the DCI format 3 or the DCI format 3A in a subframe (i−K) of a primary cell (S1700). The terminal device 1 determines which one of a TPC-PUCCH-RNTI and a TPC-PUSCH-RNTI is used for scrambling a CRC parity bit added to the DCI format 3/3A (S1702).

In a case where it is determined that the CRC parity bit added to the DCI format 3/3A is scrambled by the TPC-PUCCH-RNTI, the terminal device 1 determines whether the first UL-DL configuration is set (S1704).

In a case where it is determined that the CRC parity bit added to the DCI format 3/3A is scrambled by the TPC-PUCCH-RNTI the terminal device 1 determines whether the first UL-DL configuration is set (S1704).

In a case where it is determined, in Step S1704, that the first UL-DL configuration is set, the terminal device 1 causes the process to proceed to Step S1706. In a case where it is determined, in Step S1704, that the first UL-DL configuration is not set, the terminal device 1 causes the process to proceed to Step S1708.

In a case where it is determined that the CRC parity bit added to the DCI format 3/3A is scrambled by the TPC-PUSCH-RNTI, the terminal device 1 causes the process to proceed to Step S1710.

In Step S1706, the terminal device 1 specifies the value of K based on the first UL-DL configuration. The terminal device 1 determines a value of the parameter g(i) in the subframe i of the primary cell, based on the value of a TPC command included in the DCI format 3 or the DCI format 3A which is received in the subframe (i−K).

In Step S1708, the terminal device 1 specifies the value of K based on the second UL-DL configuration. The terminal device 1 determines a value of the parameter g(i) in the subframe i of the primary cell, based on the value of a TPC command included in the DCI format 3 or the DCI format 3A which is received in the subframe (i−K).

In Step S1710, the terminal device 1 specifies the value of K based on the second UL-DL configuration. The terminal device 1 determines a value of the parameter f(i) in the subframe i of the primary cell, based on the value of a TPC command included in the DCI format 3 or the DCI format 3A which is received in the subframe (i−K).

Here, in a case where one primary cell is configured or in a case where one primary cell and one secondary cell are configured, and the first UL reference UL-DL configuration for the primary cell is the same as the first Ul, reference UL-DL configuration for the secondary cell, the first UL-DL configuration corresponds to the first DL reference UL-DL configuration.

In a case where one primary cell and one secondary cell are configured, and the first DL reference UL-DL configuration for the primary cell is different from the first DL reference UL-DL configuration for the secondary cell, the first UL-DL configuration corresponds to the second DL reference UL-DL configuration.

In a case where one primary cell is configured or in a case where one primary cell and one secondary cell are configured, and the first UL reference UL-DL configuration for the primary cell is the same as the first UL reference UL-DL configuration for the secondary cell, the second UL-DL configuration corresponds to the first UL reference UL-DL configuration.

In a case where one primary cell and one secondary cell are configured, and the first DL reference UL-DL configuration for the primary cell is different from the first DL reference UL-DL configuration for the secondary cell, the second UL-DL configuration corresponds to the second UL reference UL-DL configuration.

A configuration of the device according to the embodiment will be described below.

Figure 18:
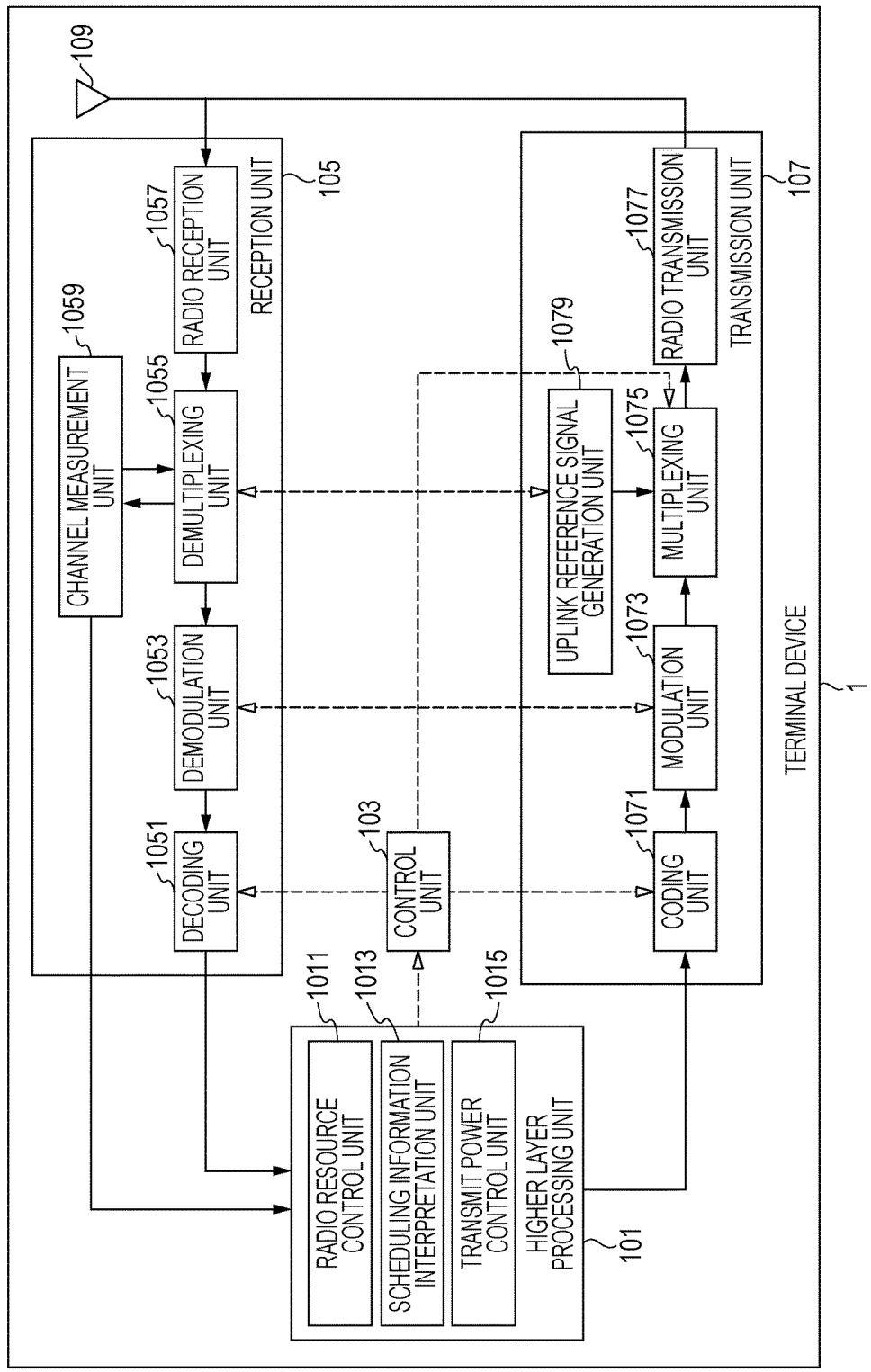
FIG. 18 is a schematic block diagram illustrating a configuration of a terminal device 1 according to the embodiment.

FIG. 18 is a schematic block diagram illustrating a configuration of the terminal device 1 in the embodiment. As illustrated in FIG. 18, the terminal device 1 includes a higher layer processing unit 101, a control unit 103, a reception unit 105, a transmission unit 107, and a transmit/receive antenna unit 109. The higher layer processing unit 101 includes a radio resource control unit 1011, a scheduling information interpretation unit 1013, and a transmission power control unit 1015. The reception unit 105 includes a decoding unit 1051, a demodulation unit 1053, a demultiplexing unit 1055, a radio reception unit 1057, and a channel measurement unit 1059. The transmission unit 107 includes a coding unit 1071, a modulation unit 1073, a multiplexing unit 1075, a radio transmission unit 1077, and an uplink reference signal generation unit 1079.

The higher layer processing unit 101 outputs uplink data (transport block) generated by an operation of a user, to the transmission unit 107. The higher layer processing unit 101 performs processing of a medium access control (MAC) layer, a packet data convergence protocol (PDCP) layer, a radio link control (RLC) layer, and a radio resource control (RRC) layer.

The radio resource control unit 1011 included in the higher layer processing unit 101 manages various types of setting information/parameters of the device. The radio resource control unit 1011 sets the various types of setting information/parameters, based on a signal of the higher layer which is received from the base station apparatus 3. That is, the radio resource control unit 1011 sets the various types of setting information/parameters based on information which has been received from the base station apparatus 3 and indicates the various types of setting information/parameters. The radio resource control unit 1011 generates information mapped on each channel of an uplink, and outputs the generated information to the transmission unit 107. The radio resource control unit 1011 is also referred to as a setting unit 1011.

The scheduling information interpretation unit 1013 in the higher layer processing unit 101 interprets the DCI format (scheduling information) received through the reception unit 105, generates control information for controlling the reception unit 105 and the transmission unit 107 based on the interpretation result of the DCI format, and outputs the generated control information to the control unit 103.

The transmission power control unit 1015 in the higher layer processing unit 101 controls transmission power for transmission on a PUSCH and a PUCCH, based on various types of setting information/parameters which are managed by the radio resource control unit 1011, a TPC command, and the like.

The control unit 103 generates control signals to control the reception unit 105 and the transmission unit 107 based on the control information from the higher layer processing unit 101. The control unit 103 outputs the generated control signals to the reception unit 105 and the transmission unit 107 to control the reception unit 105 and the transmission unit 107.

The reception unit 105 separates, demodulates, and decodes reception signals received from the base station apparatus 3 through the transmit/receive antenna unit 109, in accordance with control signals input from the control unit 103. The reception unit 105 outputs the decoded information to the higher layer processing unit 101.

The radio reception unit 1057 converts the signals of a downlink received through the transmit/receive antenna unit 109 into a baseband signal (down covert) by quadrature demodulation. The radio reception unit 1057 removes unnecessary frequency components, controls an amplification level such that the signal levels are appropriately maintained, performs quadrature demodulation based on the in-phase components and quadrature components of the received signals, and converts the quadrature-demodulated analog signals to digital signals. The radio reception unit 1057 removes a unit corresponding to a cyclic prefix (CP) from the converted digital signals, performs fast Fourier transform (FFT) on the signals with the CP removed, and extracts the signals of the frequency domain.

The demultiplexing unit 1055 separates the extracted signals into the PHICH, the PDCCH, the EPDCCH, the PDSCH, and the downlink reference signal. The demultiplexing unit 1055 compensates for the propagation path of the PHICH, the PDCCH, the EPDCCH, and the PDSCH from an estimation value of the propagation path input from the channel measurement unit 1059. The demultiplexing unit 1055 outputs the separated downlink reference signal to the channel measurement unit 1059.

The demodulation unit 1053 synthesizes the signals by multiplying the PHICH by a corresponding code, performs demodulation according to a BPSK (Binary Phase Shift Keying) modulation system on the synthesized signals, and outputs the demodulation result to the decoding unit 1051. The decoding unit 1051 decodes the PHICH addressed to the mobile station device and outputs the decoded HARQ indicator to the higher layer processing unit 101. The demodulation unit 1053 performs demodulation according to a QPSK modulation system on the PDCCH and/or the EPDCCH and outputs the demodulation result to the decoding unit 1051. The decoding unit 1051 attempts to decode the PDCCH and/or the EPDCCH, and when decoding is successful, outputs the decoded downlink control information and the RNTI, to which the downlink control information corresponds, to the higher layer processing unit 101.

The demodulation unit 1053 performs demodulation according to a modulation system notified by the downlink grant, such as QPSK (Quadrature Phase Shift Keying), 16QAM (Quadrature Amplitude Modulation), or 64QAM, on the PDSCH and outputs the demodulation result to the decoding unit 1051. The decoding unit 1051 performs decoding based on information concerning a coding rate notified by the downlink control information and outputs the decoded downlink data (transport block) to the higher layer processing unit 101.

The channel measurement unit 1059 measures a path loss or a channel state of the downlink from the downlink reference signal input from the demultiplexing unit 1055 and outputs the measured path loss or the measured state of the channel to the higher layer processing unit 101. The channel measurement unit 1059 calculates an estimation value of the propagation path of the downlink from the downlink reference signal and outputs the estimation value to the demultiplexing unit 1055. The channel measurement unit 1059 performs channel measurement and/or interference measurement to calculate the CQI.

The transmission unit 107 generates the uplink reference signal according to the control signals from the control unit 103, encodes and modulates uplink data (transport block) input from the higher layer processing unit 101, multiplexes the PUCCH, PUSCH, and the generated uplink reference signal, and transmits the multiplexed signals to the base station apparatus 3 through the transmit/receive antenna unit 109.

The coding unit 1071 performs encoding, such as convolutional coding or block encoding, on the uplink control information input from the higher layer processing unit 101. The coding unit 1071 performs turbo encoding based on information which is used for the scheduling of the PUSCH.

The modulation unit 1073 modulates coding bits input from the coding unit 1071 by a modulation system notified by the downlink control information, such as BPSK, QPSK, 16QAM, or 64QAM, or a modulation system determined in advance for each channel. The modulation unit 1073 determines the number of sequences of data to be spatially multiplexed based on information which is used for the scheduling of the PUSCH, and maps a plurality of pieces of uplink data transmitted by the same PUSCH to a plurality of sequences and performs precoding on the sequences using multiple input multiple output (MIMO) spatial multiplexing (SM).

The uplink reference signal generation unit 1079 generates a sequence obtained by a rule (expression) determined in advance based on a physical layer cell identifier (physical layer cell identity: PCI, referred to as a cell ID or the like) for identifying the base station apparatus 3, a bandwidth where the uplink reference signal is allocated, a cyclic shift notified by the uplink grant, the values of parameters for generation of a DMRS sequence, and the like. The multiplexing unit 1075 rearranges the modulation symbols of the PUSCH in parallel according to the control signals input from the control unit 103 and then performs discrete Fourier transform (DFT). The multiplexing unit 1075 multiplexes the signals of the PUCCH and the PUSCH and the generated uplink reference signal for each transmit antenna port. That is, the multiplexing unit 1075 maps the signals of the PUCCH and the PUSCH and the generated uplink reference signal in the resource elements for each transmit antenna port.

The radio transmission unit 1077 performs inverse fast Fourier transform (IFFT) on the multiplexed signals so as to generate a SC-FDMA symbol. The radio transmission unit 1077 appends a CP to the SC-FDMA symbol, generates a baseband digital signal, converts the baseband digital signal to an analog signal, and removes excessive frequency components by using a low pass filter. The radio transmission unit 1077 performs conversion into a carrier frequency (up-conversion), performs power amplification, and outputs and transmits the power-amplified signals to the transmit/receive antenna unit 109.

Figure 19:
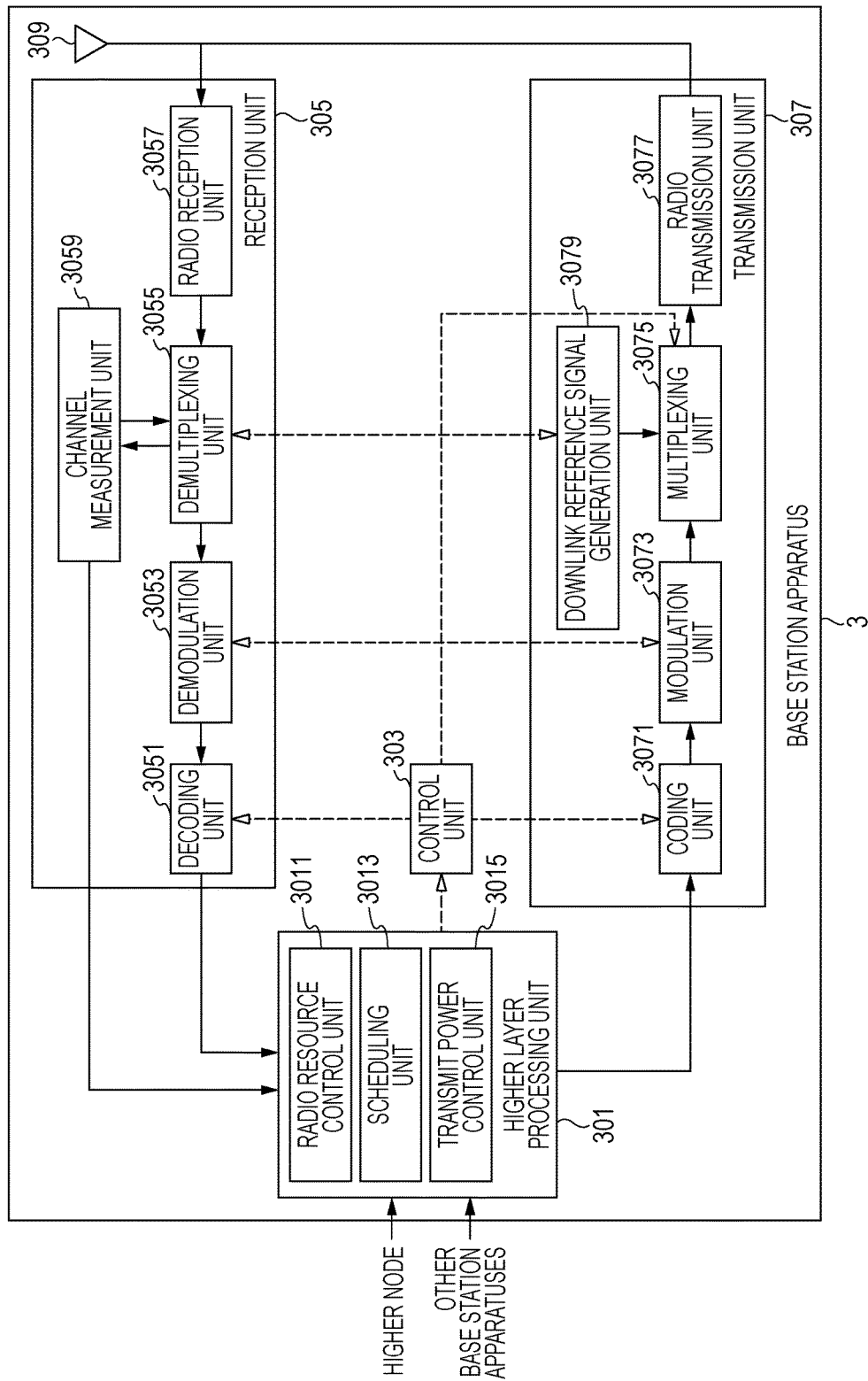
FIG. 19 is a schematic block diagram illustrating a configuration of a base station apparatus 3 according to the embodiment.

FIG. 19 is a schematic block diagram illustrating a configuration of the base station apparatus 3 in the embodiment. As illustrated in FIG. 19, the base station apparatus 3 includes a higher layer processing unit 301, a control unit 303, a reception unit 305, a transmission unit 307, and a transmit/receive antenna unit 309. The higher layer processing unit 301 includes a radio resource control unit 3011, a scheduling unit 3013, and a transmission power control unit 3015. The reception unit 305 includes a decoding unit 3051, a demodulation unit 3053, a demultiplexing unit 3055, a radio reception unit 3057, and a channel measurement unit 3059. The transmission unit 307 includes a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. The higher layer processing unit 301 generates control information to control the reception unit 305 and the transmission unit 307 and outputs the generated control information to the control unit 303.

The radio resource control unit 3011 in the higher layer processing unit 301 generates downlink data (transport block) arranged in the PDSCH of the downlink, system information, an RRC message, a MAC CE (Control Element), and the like, or acquires downlink data, the system information, the RRC message, and the MAC CE from a higher node, and outputs downlink data, the system information, the RRC message, and the MAC CE to the transmission unit 307. The radio resource control unit 3011 manages various types of setting information/parameters of each terminal device 1. The radio resource control unit 3011 may set the various types of setting information/parameters for each terminal device 1, by using a signal of the higher layer. That is, the radio resource control unit 1011 transmits/broadcasts information indicating the various types of setting information/parameters. The radio resource control unit 3011 is also referred to as a setting unit 3011.

The scheduling unit 3013 in the higher layer processing unit 301 determines the frequency and the subframe to which the physical channels (PDSCH and PUSCH) are allocated, the coding rate and the modulation scheme of the physical channels (PDSCH and PUSCH), transmission power, and the like, based on the received channel state information, the estimation value of the channel or the channel quality input from the channel measurement unit 3059, and the like. The scheduling unit 3013 generates control information (for example, DCI format) for controlling the reception unit 305 and the transmission unit 307, based on the scheduling result. The scheduling unit 3013 outputs the generated control information to the control unit 303. The scheduling unit 3013 determines a timing at which transmission processing and reception processing is performed.

The transmission power control unit 3015 in the higher layer processing unit 301 controls transmission power for transmission on a PUSCH and a PUCCH by the terminal device 1, through various types of setting information/parameters which are managed by the radio resource control unit 3011, a TPC command, and the like.

The control unit 303 generates control signals to control the reception unit 305 and the transmission unit 307 based on the control information from the higher layer processing unit 301. The control unit 303 outputs the generated control signals to the reception unit 305 and the transmission unit 307 to control the reception unit 305 and the transmission unit 307.

The reception unit 305 separates, demodulates, and decodes a reception signal received from the terminal device 1 through the transmit/receive antenna unit 309, in accordance with control signals input from the control unit 303. The reception unit 305 outputs the decoded information to the higher layer processing unit 301. The radio reception unit 3057 converts the signal of an uplink received through the transmit/receive antenna unit 309 into a baseband signal (down covert) by quadrature demodulation. The radio reception unit 3057 removes unnecessary frequency components, controls an amplification level such that the signal levels are appropriately maintained, performs quadrature demodulation based on the in-phase components and quadrature components of the received signal, and converts the quadrature-demodulated analog signal to a digital signal.

The radio reception unit 3057 removes a unit corresponding to a cyclic prefix (CP) from the converted digital signal. The radio reception unit 3057 performs fast Fourier transform (FFT) on the signal with the CP removed, and extracts the signal of the frequency domain. The radio reception unit 3057 outputs the extracted signal to the demultiplexing unit 3055.

The demultiplexing unit 1055 separates the signals input from the radio reception unit 3057 into the PUCCH, the PUSCH, the uplink reference signal, and the like. The separation is performed based on allocation information of radio resources included in the uplink grant determined by the radio resource control unit 3011 of the base station apparatus 3 and notified to each terminal device 1. The demultiplexing unit 3055 compensates for the propagation path of the PUCCH and the PUSCH from the estimation value of the propagation input from the channel measurement unit 3059. The demultiplexing unit 3055 outputs the separated uplink reference signal to the channel measurement unit 3059.

The demodulation unit 3053 performs inverse discrete Fourier transform (IDFT) on the PUSCH, acquires the modulation symbols, and demodulates the reception signals using a modulation system determined in advance, such as BPSK (Binary Phase Shift Keying), QPSK, 16QAM, or 64QAM, or a modulation system notified in advance from the base station apparatus to each terminal device 1 by the uplink grant on each of the modulation symbols of the PUCCH and the PUSCH. The demodulation unit 3053 separates the modulation symbols of a plurality of pieces of uplink data transmitted in the same PUSCH using MIMO SM based on the number of sequences to be spatially multiplexed notified in advance to each terminal device 1 by the uplink grant and information indicating precoding on the sequences.

The decoding unit 3051 decodes the coding bits of the demodulated PUCCH and PUSCH at a coding rate determined in advance of an encoding system determined in advance or a coding rate notified in advance from the base station apparatus to each terminal device 1 by the uplink grant and outputs the decoded uplink data and the uplink control information to the higher layer processing unit 101. When retransmitting the PUSCH, the decoding unit 3051 decodes coding bits held in a HARQ buffer input from the higher layer processing unit 301 and the demodulated coding bits. The channel measurement unit 309 measures the estimation value of the propagation path, the channel quality, and the like from the uplink reference signal input from the demultiplexing unit 3055 and outputs the measurement result to the demultiplexing unit 3055 and the higher layer processing unit 301.

The transmission unit 307 generates the downlink reference signal according to the control signals input from the control unit 303, encodes and modulates the HARQ indicator and the downlink control information, and downlink data input from the higher layer processing unit 301, multiplexes the PHICH, the PDCCH, the EPDCCH, the PDSCH, and the downlink reference signal, and outputs the signals to the terminal device 1 through the transmit/receive antenna unit 309.

The coding unit 3071 encodes the HARQ indicator, the downlink control information, and downlink data input from the higher layer processing unit 301 using an encoding system determined in advance, such as block encoding, convolutional coding, or turbo encoding, or an encoding system determined by the radio resource control unit 3011. The modulation unit 3073 modulates the coding bits input from the coding unit 3071 by a modulation system determined in advance, such as BPSK, QPSK, 16QAM, or 64QAM, or a modulation system determined by the radio resource control unit 3011.

The downlink reference signal generation unit 3079 generates a sequence obtained by a rule determined in advance based on the physical layer cell identifier (PCI) or the like for identifying the base station apparatus 3 and known to the terminal device 1 as the downlink reference signal. The multiplexing unit 3075 multiplexes the modulation symbols of each modulated channel and the generated downlink reference signal. That is, the multiplexing unit 3075 maps the modulation symbols of each modulated channel and the generated downlink reference signal in the resource elements.

The radio transmission unit 3077 performs inverse fast Fourier transform (IFFT) on the multiplexed modulation symbol so as to generate an OFDM symbol. The radio transmission unit 3077 appends a CP to the OFDM symbol, generates a baseband digital signal, converts the baseband digital signal to an analog signal, and removes excessive frequency components by using a low pass filter. The radio transmission unit 3077 performs conversion into a carrier frequency (up-conversion), performs power amplification, and outputs and transmits the power-amplified signal to the transmit/receive antenna unit 309.

More specifically, the terminal device 1 according to the embodiment includes the reception unit 105 which receives information indicating the first DL reference UL-DL configuration, information indicating the first UL reference UL-DL configuration, information indicating the TPC-PUCCH-RNTI, information indicating the TPC-PUSCH-RNTI, information indicating the parameter tpc-index corresponding to the TPC-PUCCH-RNTI, information indicating the parameter tpc-index corresponding to the TPC-PUSCH-RNTI, the DCI format 3/3A to which a CRC parity bit scrambled by the TPC-PUCCH-RNTI is added, and the DCI format 3/3A to which a CRC parity bit scrambled by the TPC-PUSCH-RNTI is added.

The terminal device 1 according to the embodiment includes the setting unit 1011 that sets the first UL-DL configuration, the second UL-DL configuration, and the third UL-DL configuration (transmission-direction UL-DL configuration).

The first UL-DL configuration in the embodiment is used for specifying a subframe in which HARQ-ACK corresponding to a PDSCH is transmitted, in a case where the PDSCH is received. The second UL-DL configuration in the embodiment is used for specifying a subframe in which HARQ-ACK corresponding to a PUSCH is received, in a case where the PUSCH is transmitted.

In a case where one primary cell is configured or in a case where one primary cell and one secondary cell are configured, and the first UL reference UL-DL configuration for the primary cell is the same as the first UL reference UL-DL configuration for the secondary cell, the first UL-DL configuration corresponds to the first DL reference UL-DL configuration, and the second UL-DL configuration corresponds to the first UL reference UL-DL configuration.

In a case where one primary cell and one secondary cell are configured, and the first DL reference UL-DL configuration for the primary cell is different from the first DL reference UL-DL configuration for the secondary cell, the first UL-DL configuration corresponds to the second DL reference UL-DL configuration, and the second UL-DL configuration corresponds to the second UL reference UL-DL configuration.

The terminal device 1 according to the embodiment includes the transmission power control unit 1015 that specifies a subframe in which a TPC command included in the DCI format 3/3A is applied, based on an RNTI used for scrambling a CRC parity bit which is added to the DCI format 3/3A.

The transmission power control unit 1015 in the embodiment may specify the value of K based on the RNTI used for scrambling a CRC parity bit which is added to the DCI format 3/3A, and may calculate transmission power for transmission in a subframe by the terminal device, based on a TPC command included in the DCI format 3/3A which is received in a subframe (i–K).

The transmission power control unit 1015 in the embodiment may select the first UL-DL configuration or the second UL-DL configuration based on an RNTI used for scrambling a CRC parity bit which is added to the DCI format 3/3A, select the value of K based on the selected first UL-DL configuration or the selected second UL-DL configuration, and calculate transmission power for transmission in a subframe i by the terminal device, based on a TPC command included in the DCI format 3/3A which is received in a subframe (i–K).

The transmission power control unit 1015 in the embodiment may specify the value of $K_{PUCCH}$ based on the first UL-DL configuration, and determine the value of the first parameter g(i) used for adjusting transmission power for transmission of a PUCCH in a subframe i, based on a TPC command included in the DCI format 3/3A which is received in a subframe (i-$K_{PUCCH}$), in a case where the CRC parity bit added to the DCI format 3/3A is scrambled by the TPC-PUCCH-RNTI.

The transmission power control unit 1015 in the embodiment may specify the value of $K_{PUSCH}$ based on the second UL-DL configuration, and determine the value of the second parameter f(i) for adjusting transmission power for transmission of a PUSCH in a subframe i, based on a TPC command included in the DCI format 3/3A which is received in a subframe (i-$K_{PUSCH}$), in a case where the CRC parity bit added to the DCI format 3/3A is scrambled by the TPC-PUSCH-RNTI.

The transmission power control unit 1015 in the embodiment may determine the value of the first parameter for adjusting transmission power for transmission of a PUCCH in a subframe n, based on a TPC command for the PUCCH, which is included in the first DCI format received in a subframe (n-$K_{PUCCH}$). An example of the first DCI format includes DCI format 1A, DCI format 3 having an attached TPC-PUCCH-RNTI, and DCI format 3A having an attached TPC-PUCCH-RNTI.

The transmission power control unit 1015 in the embodiment may determine the value of the second parameter for adjusting transmission power for transmission of a PUSCH in a subframe m, based on a TPC command for the PUSCH, which is included in the second DCI format received in a subframe (m-$K_{PUSCH}$). An example of the second DCI format includes DCI format 0, DCI format 3 having an attached TPC-PUSCH-RNTI, and DCI format 3A having an attached TPC-PUSCH-RNTI.

The transmission power control unit 1015 in the embodiment may specify the value of $K_{PUCCH}$ based on the first UL-DL configuration, and specify the value of $K_{PUSCH}$ based on the second UL-DL configuration.

The transmission power control unit 1015 in the embodiment may set the value of the first parameter in a subframe i of which an instruction as an uplink subframe is not performed by the first UL-DL configuration, to the value of the first parameter for a subframe (i−1). Setting the value of the first parameter for a subframe i to the value of the first parameter for a subframe (i−1) may mean that the value of the first parameter for the subframe i is not updated.

The transmission power control unit 1015 in the embodiment may specify the value of $K_{PUCCH}$ based on the second UL-DL configuration, and set the value of the first parameter for the subframe i of which an instruction as an uplink subframe is not performed by the second UL-DL configuration, to the value of the first parameter for a subframe (i−1), in a case where the first UL-DL configuration is not set.

That is, the transmission power control unit 1015 in the embodiment may specify the value of $K_{PUCCH}$ based on the first UL-DL configuration, and set the value of the first parameter for the subframe i of which an instruction as an uplink subframe is not performed by the first UL-DL configuration, to the value of the first parameter for a subframe (i−1), in a case where first UL-DL configuration is set.

The transmission power control unit 1015 in the embodiment may set the value of the second parameter for a subframe k of which an instruction as an uplink subframe is not performed by the second UL-DL configuration, to the value of the second parameter for a subframe (k−1). The transmission power control unit 1015 may set the value of the second parameter for a subframe k of which an instruction as an uplink subframe is not performed by the third UL-DL configuration, to the value of the second parameter for a subframe (k−1). Setting the value of the second parameter for a subframe k to the value of the first parameter for a subframe (k−1) may mean that the value of the second parameter for the subframe k is not updated.

The transmission power control unit 1015 in the embodiment may set the value of the second parameter for a subframe k of which an instruction as an uplink subframe is not performed by the third UL-DL configuration, to the value of the second parameter for a subframe (k−1), in a case where the first UL-DL configuration is set. The transmission power control unit 1015 may set the value of the second parameter for a subframe k of which an instruction as an uplink subframe is not performed by the second UL-DL configuration, to the value of the second parameter for a subframe (k−1), in a case where the first UL-DL configuration is set.

The base station apparatus 3 according to the embodiment includes the transmission unit 307 that transmits information indicating the first DL reference UL-DL configuration, information indicating the first UL reference UL-DL configuration, information indicating the TPC-PUCCH-RNTI, information indicating the TPC-PUSCH-RNTI, information indicating the parameter tpc-index corresponding to the TPC-PUCCH-RNTI, information indicating the parameter tpc-index corresponding to the TPC-PUSCH-RNTI, the DCI format 3/3A to which a CRC parity bit scrambled by the TPC-PUCCH-RNTI is added, and the DCI format 3/3A to which a CRC parity bit scrambled by the TPC-PUSCH-RNTI is added.

The base station apparatus 3 according to the embodiment includes the setting unit 3011 that sets the first UL-DL configuration and the second UL-DL configuration in the terminal device 1 through a signal of a higher layer.

The base station apparatus 3 according to the embodiment includes the transmission power control unit 3015 that controls transmission power for transmission in a subframe i by the terminal device, by using a TPC command which is included in the DCI format 3/3A transmitted in a subframe (i-K).

The transmission power control unit 3015 in the embodiment may specify the value of K based on the first UL-DL configuration, in a case where a CRC parity bit added to the DCI format 3/3A is scrambled by the TPC-PUCCH-RNTI.

The transmission power control unit 3015 in the embodiment may specify the value of K based on the second UL-DL configuration, in a case where a CRC parity bit added to the DCI format 3/3A is scrambled by the TPC-PUSCH-RNTI.

The transmission power control unit 3015 in the embodiment may specify the value of $K_{PUCCH}$ based on the first UL-DL configuration, and adjust the first parameter g(i) in a subframe i by using a TPC command which is included in the DCI format 3/3A. The DCI format 3/3A is transmitted in a subframe (i-$K_{PUCCH}$) and has an added CRC parity bit which is scrambled by the TPC-PUCCH-RNTI. The first parameter g(i) is used for controlling transmission power for transmission of a PUCCH by the terminal device.

The transmission power control unit 3015 in the embodiment may specify the value of $K_{PUSCH}$ based on the second UL-DL configuration, and adjust the second parameter f(i) in a subframe i by using a TPC command which is included in the DCI format 3/3A. The DCI format 3/3A is transmitted in a subframe (i-$K_{PUSCH}$) and has an added CRC parity bit which is scrambled by the TPC-PUSCH-RNTI. The second parameter f(i) is used for controlling transmission power for transmission of a PUSCH by the terminal device.

The transmission power control unit 3015 in the embodiment may adjust the first parameter used for controlling transmission power for transmission of a PUCCH in a subframe n by the terminal device, by using a TPC command for the PUCCH, which is transmitted in a subframe (n-$K_{PUSCH}$) and is included in the first DCI format. The value of $K_{PUCCH}$ may be specified based on the first UL-DL configuration.

The transmission power control unit 3015 in the embodiment may adjust the second parameter used for controlling transmission power for transmission of a PUSCH in a subframe m by the terminal device, by using a TPC command for the PUSCH, which is transmitted in a subframe (m-$K_{PUSCH}$) and is included in the second DCI format. The value of $K_{PUSCH}$ may be specified based on the second UL-DL configuration.

In the base station apparatus 3 according to the embodiment, the value of the first parameter for a subframe i of which an instruction as an uplink subframe is not performed by the first UL-DL configuration may be set to the value of the first parameter for a subframe (i−1).

In the base station apparatus 3 according to the embodiment, the value of $K_{PUCCH}$ may be specified based on the second UL-DL configuration, the value of the first parameter for a subframe i of which an instruction as an uplink subframe is not performed by the second UL-DL configuration may be set to the value of the first parameter for a subframe (i−1), in a case where the first UL-DL configuration is not set.

That is, in the base station apparatus 3 according to the embodiment, the value of $K_{PUCCH}$ may be specified based on the first UL-DL configuration, and the value of the first parameter for a subframe i of which an instruction as an uplink subframe is not performed by the first UL-DL configuration may be set to the value of the first parameter for a subframe (i−1), in a case where the first UL-DL configuration is set.

In the base station apparatus 3 according to the embodiment, the value of the second parameter for a subframe k of which an instruction as an uplink subframe is not performed by the second UL-DL configuration may be set to the value of the second parameter for a subframe (k−1). In the base station apparatus 3, the value of the second parameter for a subframe k of which an instruction as an uplink subframe is not performed by the third UL-DL configuration may be set to the value of the second parameter for a subframe (k−1).

In the base station apparatus 3 according to the embodiment, in a case where the first UL-DL configuration is set, the value of the second parameter for a subframe k of which an instruction as an uplink subframe is not performed by the third UL-DL configuration may be set to the value of the second parameter for a subframe (k−1). In the base station apparatus 3, in a case where the first UL-DL configuration is not set, the value of the second parameter for a subframe k of which an instruction as an uplink subframe is not performed by the second UL-DL configuration may be set to the value of the second parameter for a subframe (k−1).

Thus, the terminal device can efficiently perform processing relating to the transmission power.

A program operating in the base station apparatus 3 and the terminal device 1 of the present invention is a program (a program for causing a computer to function) to control a central processing unit (CPU) and the like so as to implement the functions of the foregoing embodiment of the present invention. Information which is handled by the devices is temporarily accumulated in a RAM (Random Access Memory) while processed, and is then stored in various ROMs, such as a Flash ROM (Read Only Memory), or an HDD (Hard Disk Drive). Information is read by the CPU as necessary, and is modified and written.

Part of the terminal device 1 and the base station apparatus 3 in the foregoing embodiment may be implemented by a computer. In this case, a program for implementing the control function may be recorded in a computer-readable recording medium, and the program recorded in the recording medium may be read on a computer system and executed.

The term "computer system" used herein is a computer system which is incorporated in the terminal device 1 or the base station apparatus 3, and includes an OS or hardware, such as peripherals. The term "computer-readable recording medium" refers to a portable medium, such as a flexible disk, a magneto-optical disk, a ROM, or a CD-ROM, or a storage device, such as a hard disk incorporated in the computer system.

The term "computer-readable recording medium" may include a medium which holds the program in a short period of time or dynamically, such as a communication line when transmitting the program through a network, such as Internet, or a communication line, such as a telephone line, and a medium which holds the program in a certain period of time, such as a volatile memory inside the computer system to be a server or a client. The program may implement some of the above-described functions or may implement the above-described functions in combination with the program already recorded in the computer system.

The base station apparatus 3 in the foregoing embodiment may be implemented as an aggregate (device group) of a plurality of devices. Each device in the device group may include part or all of the functions or the function blocks of the base station apparatus 3 of the foregoing embodiment. As the device group, the general functions or functional blocks of the base station apparatus 3 may be provided. The terminal device 1 of the foregoing embodiment may communicate with the base station apparatus as an aggregate.

The base station apparatus 3 in the foregoing embodiment may be EUTRAN (Evolved Universal Terrestrial Radio Access Network). The base station apparatus 3 in the foregoing embodiment may have part or all of the functions of a higher node to eNodeB.

Part or all of the terminal device 1 and the base station apparatus 3 of the foregoing embodiment may be typically implemented as an LSI, which is an integrated circuit, or may be implemented as a chipset. The functional blocks of the terminal device 1 and the base station apparatus 3 may be individually integrated into chips, or some or all of the functional blocks may be integrated into a chip. The integration into a circuit is not limited to LSI and may be implemented by a dedicated circuit or a general-purpose processor. When a technique for integration into a circuit, which will replace LSI, emerges with the advancement of semiconductor technology, an integrated circuit based on the technique may be used.

In the foregoing embodiment, a terminal device has been described as a communication device, the invention is not limited thereto and may be applied to stationary or immovable electronic apparatuses indoors and outdoors, for example, terminal devices, such as an AV system, kitchen equipment, cleaning and washing equipment, air conditioner, office equipment, vending machine, and other living appliances, or communication devices.

While the embodiments of the invention have been described referring to the drawings, specific configurations are not limited to the embodiments and design changes within the scope of the invention are also encompassed. Various modifications may be made to the invention within the scope defined by the appended claims, and an embodiment practiced by combining appropriate technical means disclosed in different embodiments also falls within the technical scope of the invention. A configuration in which elements described in the embodiments and having similar effects are interchanged is also encompassed.

INDUSTRIAL APPLICABILITY

The present invention can be applied to a terminal device, a communication device, or the like such as AV equipment, a kitchen utensil, cleaning and washing equipment, an air conditioner, office equipment, a vending machine living appliances.

DESCRIPTION OF REFERENCE NUMERALS

1(1A, 1B, 1C) Terminal Device
3 Base Station Apparatus

101 Higher Layer Processing Unit
103 Control Unit
105 Reception Unit
107 Transmission Unit
301 Higher Layer Processing Unit
303 Control Unit
305 Reception Unit
307 Transmission Unit
1011 Radio Resource Control Unit
1013 Scheduling Information Interpretation Unit
1015 Transmission Power Control Unit
3011 Radio Resource Control Unit
3013 Scheduling Unit
3015 Transmission Power Control Unit

The invention claimed is:

1. A terminal apparatus configured to communicate with a base station apparatus, the terminal apparatus comprising:
receiving circuitry configured to:
receive, in a subframe n-K, downlink control information (DCI) including a transmission power control (TPC) command for a physical uplink control channel (PUCCH) or a physical uplink shared channel (PUSCH), wherein n and K are positive integers,
receive at least one of first information and second information different from the first information,
the first information indicating a first uplink-downlink configuration used for specifying a first subframe in which a first hybrid automatic repeat request-acknowledgment (HARQ-ACK) is transmitted in response to reception on a physical downlink shared channel (PDSCH), and
the second information indicating a second uplink-downlink configuration used for specifying a second subframe in which a second HARQ-ACK is received in response to transmission on the PUSCH; and
transmission power control circuitry configured to:
in a first case that the DCI is attached with cyclic redundancy check (CRC) parity bits scrambled by a TPC-PUSCH-radio network temporary identifier (RNTI),
determine a first value of K based on the second uplink-downlink configuration, and
determine, based on the TPC command for the PUSCH, a first value of a first parameter used for setting a first power for transmission on the PUSCH in a subframe n,
in a second case that the DCI is attached with CRC parity bits scrambled by a TPC-PUCCH-RNTI, and the first information is received,
determine a second value of K based on the first uplink-downlink configuration, and
determine, based on the TPC command for the PUCCH, a second value of a second parameter used for setting a second power for transmission on the PUCCH in the subframe n, and
in a third case that the DCI is attached with CRC parity bits scrambled by the TPC-PUCCH-RNTI, and the first information is not received,
determine a third value of K based on the second uplink-downlink configuration, and
determine, based on the TPC command for the PUCCH, a third value of the second parameter.

2. A base station apparatus configured to communicate with a terminal apparatus, the base station apparatus comprising:
transmitting circuitry configured to:
transmit, in a subframe n-K, downlink control information (DCI) including a transmission power control (TPC) command for a physical uplink control channel (PUCCH) or a physical uplink shared channel (PUSCH), wherein n and K are positive integers,
transmit at least one of first information and second information different from the first information,
the first information indicating a first uplink-downlink configuration used for specifying a first subframe in which a first hybrid automatic repeat request-acknowledgment (HARQ-ACK) is received in response to transmission on a physical downlink shared channel (PDSCH), and
the second information indicating a second uplink-downlink configuration used for specifying a second subframe in which a second HARQ-ACK is transmitted in response to reception on the PUSCH; and
transmission power control circuitry configured to:
in a first case that the DCI is attached with cyclic redundancy check (CRC) parity bits scrambled by a TPC-PUSCH-radio network temporary identifier (RNTI),
determine a first value of K based on the second uplink-downlink configuration, and
determine, based on the TPC command for the PUSCH, a first value of a first parameter used for setting a first power for transmission on the PUSCH in a subframe n,
in a second case that the DCI is attached with CRC parity bits scrambled by a TPC-PUCCH-RNTI, and the first information is transmitted,
determine a second value of K based on the first uplink-downlink configuration, and
determine, based on the TPC command for the PUCCH, a second value of a second parameter used for setting a second power for transmission on the PUSCH in the subframe n, and
in a third case that the DCI is attached with CRC parity bits scrambled by the TPC-PUCCH-RNTI, and the first information is not transmitted,
determine a third value of K based on the second uplink-downlink configuration, and
determine, based on the TPC command for the PUCCH, a third value of the second parameter.

3. A wireless communication method of a terminal apparatus configured to communicate with a base station apparatus, the wireless communication method comprising:
receiving, in a subframe n-K, downlink control information (DCI) including a transmission power control (TPC) command for a physical uplink control channel (PUCCH) or a physical uplink shared channel (PUSCH), wherein n and K are positive integers;
receiving at least one of first information and second information different from the first information,
the first information indicating a first uplink-downlink configuration used for specifying a first subframe in which a first hybrid automatic repeat request-acknowledgment (HARQ-ACK) is transmitted in response to reception on a physical downlink shared channel (PDSCH), and
the second information indicating a second uplink-downlink configuration used for specifying a second subframe in which a second HARQ-ACK is received in response to transmission on the PUSCH;

in a first case that the DCI is attached with cyclic redundancy check (CRC) parity bits scrambled by a TPC-PUSCH-radio network temporary identifier (RNTI),
  determining a first value of K based on the second uplink-downlink configuration, and
  determining, based on the TPC command for the PUSCH, a first value of a first parameter used for setting a first power for transmission on the PUSCH in a subframe n,
in a second case that the DCI is attached with CRC parity bits scrambled by a TPC-PUCCH-RNTI, and the first information is received,
  determining a second value of K based on the first uplink-downlink configuration, and
  determining, based on the TPC command for the PUCCH, a second value of a second parameter used for setting a second power for transmission on the PUCCH in the subframe n; and
in a third case that the DCI is attached with CRC parity bits scrambled by the TPC-PUCCH-RNTI, and the first information is not received,
  determining a third value of K based on the second uplink-downlink configuration, and
  determining, based on the TPC command for the PUCCH, a third value of the second parameter.

4. A wireless communication method of a base station apparatus configured to communicate with a terminal apparatus, the wireless communication method comprising:
  transmitting, in a subframe n-K, downlink control information (DCI) including a transmission power control (TPC) command for a physical uplink control channel (PUCCH) or a physical uplink shared channel (PUSCH), wherein n and K are positive integers;
  transmitting at least one of first information and second information different from the first information,
    the first information indicating a first uplink-downlink configuration used for specifying a first subframe in which a first hybrid automatic repeat request-acknowledgment (HARQ-ACK) is received in response to transmission on a physical downlink shared channel (PDSCH), and
    the second information indicating a second uplink-downlink configuration used for specifying a second subframe in which a second HARQ-ACK is transmitted in response to reception on the PUSCH;
  in a first case that the DCI is attached with cyclic redundancy check (CRC) parity bits scrambled by a TPC-PUSCH-radio network temporary identifier (RNTI),
    determining a first value of K based on the second uplink-downlink configuration, and
    determining, based on the TPC command for the PUSCH, a first value of a first parameter used for setting a first power for transmission on the PUSCH in a subframe n,
  in a second case that the DCI is attached with CRC parity bits scrambled by a TPC-PUCCH-RNTI, and the first information is transmitted,
    determining a second value of K based on the first uplink-downlink configuration, and
    determining, based on the TPC command for the PUCCH, a second value of a second parameter used for setting a second power for transmission on the PUSCH in the subframe n; and
  in a third case that the DCI is attached with CRC parity bits scrambled by the TPC-PUCCH-RNTI, and the first information is not transmitted,
    determining a third value of K based on the second uplink-downlink configuration, and
    determining, based on the TPC command for the PUCCH, a third value of the second parameter.

* * * * *